United States Patent [19]
Warman et al.

[11] Patent Number: 5,657,221
[45] Date of Patent: Aug. 12, 1997

[54] METHOD AND APPARATUS FOR CONTROLLING NON-COMPUTER SYSTEM DEVICES BY MANIPULATING A GRAPHICAL REPRESENTATION

[75] Inventors: David J. Warman, Bainbridge Island; Mark A. Lacas; Geoffrey P. Coco, both of Seattle, all of Wash.

[73] Assignee: MediaLink Technologies Corporation, Seattle, Wash.

[21] Appl. No.: 334,416

[22] Filed: Nov. 4, 1994

Related U.S. Application Data

[63] Continuation-in-part of Ser. No. 307,864, Sep. 16, 1994, abandoned.
[51] Int. Cl.$^6$ .................................................. G05B 15/02
[52] U.S. Cl. ........................ 364/188; 364/146; 395/348
[58] Field of Search ................................ 364/140, 141, 364/145, 146, 188, 189, 191; 395/155, 161, 169

[56] References Cited

U.S. PATENT DOCUMENTS

| | | | |
|---|---|---|---|
| 4,279,012 | 7/1981 | Beckedorff et al. | 364/146 |
| 4,849,880 | 7/1989 | Bhaskar et al. . | |
| 5,021,976 | 6/1991 | Wexelblat et al. | 364/146 |
| 5,062,060 | 10/1991 | Kolnick | 340/724 |
| 5,086,385 | 2/1992 | Launey et al. | 364/188 |
| 5,321,829 | 6/1994 | Zifferen | 364/147 |
| 5,335,323 | 8/1994 | Kolnick | 395/164 |
| 5,400,246 | 3/1995 | Wilson et al. | 364/146 |

FOREIGN PATENT DOCUMENTS 0 596 594  5/1994  European Pat. Off. .

Primary Examiner—Paul P. Gordon
Attorney, Agent, or Firm—Christensen, O'Connor, Johnson & Kindness PLLC

[57] ABSTRACT

The graphical control system of the present invention includes a computer (20), a device interface (35) for a non-computer system device (21) having at least one feature control (29a) (or display (29b)), a bus network (28) connecting the computer (20) to the device interface (35), and a visual network operating system (78) based on an object-oriented programming paradigm. The device interface (35) connects the non-computer system device (21) to the bus network (28) and provides the mechanism for converting computer-generated commands into signals for controlling the operation of the feature control (29a) of the non-computer system device (21). The visual network operating system (78) is a distributed operating system that is partially stored on the computer (20) and partially stored in the device interface (35). A computer portion causes the computer (20) to generate or create a visual device control (40) that graphically replicates the feature control (29a) normally associated with the non-computer system device (21). The visual device control (40) is operated by a conventional graphical control device, such as a mouse (32), track ball, touch screen, joystick, etc. As the replicated controls are operated, the computer (20) sends messages to the device interfaces (35), which cause the feature control (29a) of the non-computer system device (21) to respond in the same way it would have responded had the feature control been operated manually, electrically or effected by another computer on the bus network (28).

74 Claims, 20 Drawing Sheets

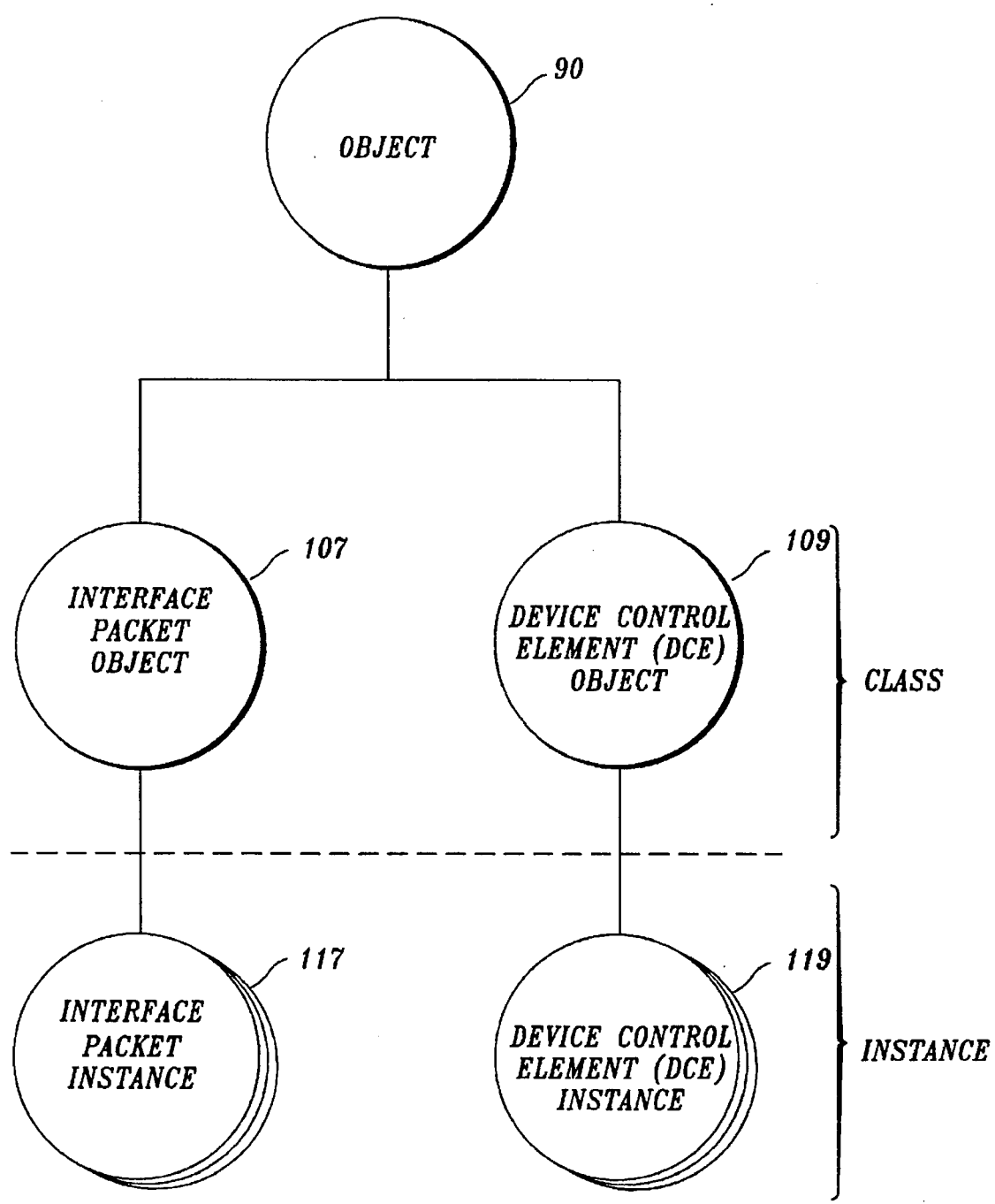
Fig. 17.A

METHOD AND APPARATUS FOR CONTROLLING NON-COMPUTER SYSTEM DEVICES BY MANIPULATING A GRAPHICAL REPRESENTATION

RELATIONSHIP TO OTHER APPLICATIONS

This application is a continuation-in-part of U.S. patent application Ser. No. 08/307,864, filed Sep. 16, 1994, now abandoned as of Dec. 26, 1995 and entitled A Method and Apparatus for Controlling Non-Computer System Devices By Manipulating a Graphical Representation. The subject matter of application Ser. No. 08/307,864 is incorporated herein by reference.

FIELD OF THE INVENTION

This invention generally relates to a method and apparatus for using a computer to control non-computer system devices connected to the computer.

BACKGROUND OF THE INVENTION

Object-oriented programming paradigms have become an increasingly common tool in computer programming. Such paradigms are often employed by graphical user interfaces, where computer system elements are visually represented and manipulated by visible screen entities such as icons on a computer screen or other display device. For programming purposes, "objects" are used to represent the manipulatable computer system elements by containing methods and data that define those elements. By representing such computer system elements as objects, it is unnecessary for the programmer to generate a specific set of code for each computer system element. Rather, the programmer can define classes of objects and assign certain universal behaviors to each class. Computer system elements that can be represented by objects include computer peripherals and computer application programs. Examples of application programs are spreadsheets, word processing programs, database programs, etc.

In graphical user interfaces employing an object-oriented programming paradigm, application programs are typically represented to a user by an icon displayed within a window on a computer screen, one icon for each application program that can be run. Execution of an application program is initiated by selecting its corresponding icon, most often using a pointing device such as a mouse. When an application program is selected, a message is sent to the corresponding application program object, indicating that the application program object is to invoke certain of its methods. For example, if a word processing program is selected, the methods contained within the application program object may include starting the word processing program. The user may also "drag" icons from one area of the screen to another, or from one window to another using the mouse. The user may even "drag" one icon representative of an application object and "drop" that icon on top of another. This "object-object" interaction will result in a combination of application objects. For example, if a word processing document icon is dropped upon a word processing program icon, the object-object interaction results in starting the word processing program and causing that program to open the word processing document. This is possible because both the word processing program and the word processing document have been represented as compatible application program objects. Hence, the icons in the object-oriented programming paradigm allow the user to graphically control various computer system elements and the interrelationships between computer system elements.

While the conventional object-oriented, graphical user interface described above has been used to allow a user to initiate execution of such computer system elements as applications programs, use of object-oriented programming paradigms to graphically control and monitor non-computer system devices has been severely limited. Non-computer system devices include virtually any electronic device equipped with the necessary hardware to be connected to a personal computer either directly or via a network. For example, non-computer system devices may include lamps, television sets, VCRs, video cameras, telephones, amplifiers, CD players, equalizers, etc. Such devices typically come equipped with a variety of feature controls and displays for operation including volume controls, power switches, input and output meters, channel selectors, etc. In order to control a non-computer system device using a graphical user interface, in the past, each feature control (e.g., a volume control) or feature display (e.g., an output meter) that is to be manipulated by the user has been coupled to the graphical user interface computer by specially designed software, resulting in a visible screen entity for each feature control of the device being displayed on the computer screen.

Conventionally, non-computer system devices have been graphically represented and controlled via a special program designed specifically for each device, where the specially designed program is either built into the computer operating system or loaded into the computer operating system as an add-on software product. For example, the CD Remote program, Version 1.3 for the Macintosh computer provides the computer user with a graphic interface for controlling a Macintosh CD player hardwired to the computer. The user is provided with a graphical display of the CD player's control panel, complete with graphical stop, play, pause, skip, etc. controls. To initiate execution of any one of these commands upon the CD player, the user merely selects the corresponding graphical control using the mouse. Unlike graphical user interface programs for controlling applications programs, the graphical controls are not visible screen entities that the user can "drag and drop" or "cut and paste" into other areas of the screen, into other windows, or on top of one another. Instead, the placement, position and execution of each of the graphical controls is predefined by the specially designed CD Remote program for the CD player.

In contrast to the Macintosh CD player, non-computer system devices are normally not used alone. Instead, non-computer system devices are used in combination with other non-computer system devices. For example, a stereo system often comprises at least a CD player, an equalizer and an amplifier, each of which may be made by the same or a different manufacturer. In order to use a personal computer to operate an entire stereo system using the approach employed by the CD Remote program referred to above, each stereo system device would be necessarily be hardwired to the personal computer and a specially designed program comprising specific sets of code would be necessary for controlling each device, each feature control, and each feature display on each device, and for controlling the relationships between the devices and the feature controls and displays. In addition, the code would have to be specially designed for each manufacturer's device. Even if the devices were connected to the personal computer via a network as opposed to directly hardwired, specialized code would still be required to control each device because, prior to the present invention, a graphic user interface employing an object-oriented programming paradigm for controlling stereo devices produced by varying manufacturers did not exist.

Accordingly, there is a need for a graphical control system for controlling non-computer system devices and the relationships between those devices. In order to eliminate the need for specially designed code for each device, such a graphical control system should employ a common paradigm for representing the non-computer system devices to be controlled. In addition, the graphical control system should provide for dynamic visual device controls that represent each feature control of a device and allow a user to graphically control and monitor each device without having any specific knowledge about the device and without making any physical contact with the device. The present invention is directed to providing such a graphical control system.

SUMMARY OF THE INVENTION

In accordance with this invention, a graphical control system for controlling non-computer system devices is provided. Non-computer system devices are devices that can be electronically controlled such as musical amplifiers and equalizers, television sets, VCRs, video cameras, etc. Virtually any electronic device equipped with the necessary hardware to be either directly or indirectly controlled by a computer, including a simple on/off switch, can form a non-computer system device. The graphical control system includes a computer, an interface(s) for a non-computer system device(s) having at least one feature control, a coupling medium for coupling the computer to the interface(s) and a visual network operating system (VNOS). The coupling medium can be a bus network or simply a point-to-point connection between a computer and a single non-computer system device. Various typed of bus networks can be used including fiber optics, co-axial cable and twisted wire pair. The coupling medium could also include a radio frequency coupling medium, such as a radio frequency coupling network. The interface(s) connects the non-computer system device(s) to the bus network and provides the mechanism for converting computer-generated commands into signals for controlling the operation of the non-computer system devices.

The visual network operating system (VNOS) is a distributed operating system that is partially stored in a computer and partially stored in the interface(s). The major portion is stored in the computer. The computer portion causes the computer to generate or create graphical controls that represent the type of feature controls normally associated with the non-computer system devices connected to the network. For example, in the case of a musical amplifier, such controls may include an on/off switch, an input meter and a volume control. An equalizer would include boost and cut controls for frequency bands. The graphical controls are operated by a conventional graphical control device, such as a mouse, track ball, touch screen, joystick, etc. As the graphical controls are operated, the computer sends messages to the interface(s), which cause the non-computer system devices to respond in the same way the devices would have responded to the manual or electrical operation of the equivalent feature controls.

In accordance with other aspects of this invention, the visual network operating system (VNOS) is based on an object-oriented programming paradigm in which objects are interoperable and are organized into classes in a hierarchical fashion.

In accordance with further aspects of this invention, five different types of objects are employed by the invention. They are: window objects; visual reference objects; value control element (VCE) objects; device objects; and packet objects. Window objects contain the data and methods necessary for displaying a window on the screen of the computer display. Visual reference objects contain the methods and data necessary for displaying and associating icons and visual device controls (VDCs) with a window object. A VCE object contains a value represented by the VDC and controlled by setting the VDC, and methods for manipulating the value. A device object contains the methods and data for communicating with particular types of non-computer system devices and for managing a graphical representation of a non-computer system device. Packet objects contain the methods and data for communicating data between the computer and non-computer system devices via the network.

In accordance with yet other aspects of this invention, the window, visual reference, VCE, device, and packet objects are subdivided into lower order subclasses.

As can be readily appreciated from the foregoing summary, the invention provides a graphical control system for controlling a wide variety of non-computer system devices. Virtually any electronic device equipped with the necessary hardware can be controlled. The graphical control system creates visual device controls that represent the feature controls and feature displays normally associated with the non-computer system device that is to be controlled. The visual device controls are operated by a conventional user manipulation device, such as a mouse, track ball, touch screen, joystick, etc. The invention eliminates the need for specially designed code for each non-computer system device by employing an object-oriented paradigm to represent the non-computer system devices. While the invention is designed for use, in part, in the forward direction wherein the computer controls non-computer system devices, in some versions of the invention it is desirable for the non-computer system devices to be subject to manual or electrical control, monitoring, or control by another computer. In such cases data representing control changes are sent from the non-computer system devices and/or other computers to all other non-computer devices and personal computers on the network which store object data related to the control being changed. As a result, any associated visual device control is updated and monitored.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 17A is a hierarchical diagram of an object-oriented programming paradigm implemented in a device as part of the graphical control system shown in FIG. 1 provided by a device;

DETAILED DESCRIPTION OF THE PREFERRED EMBODIMENT

Figure 1:
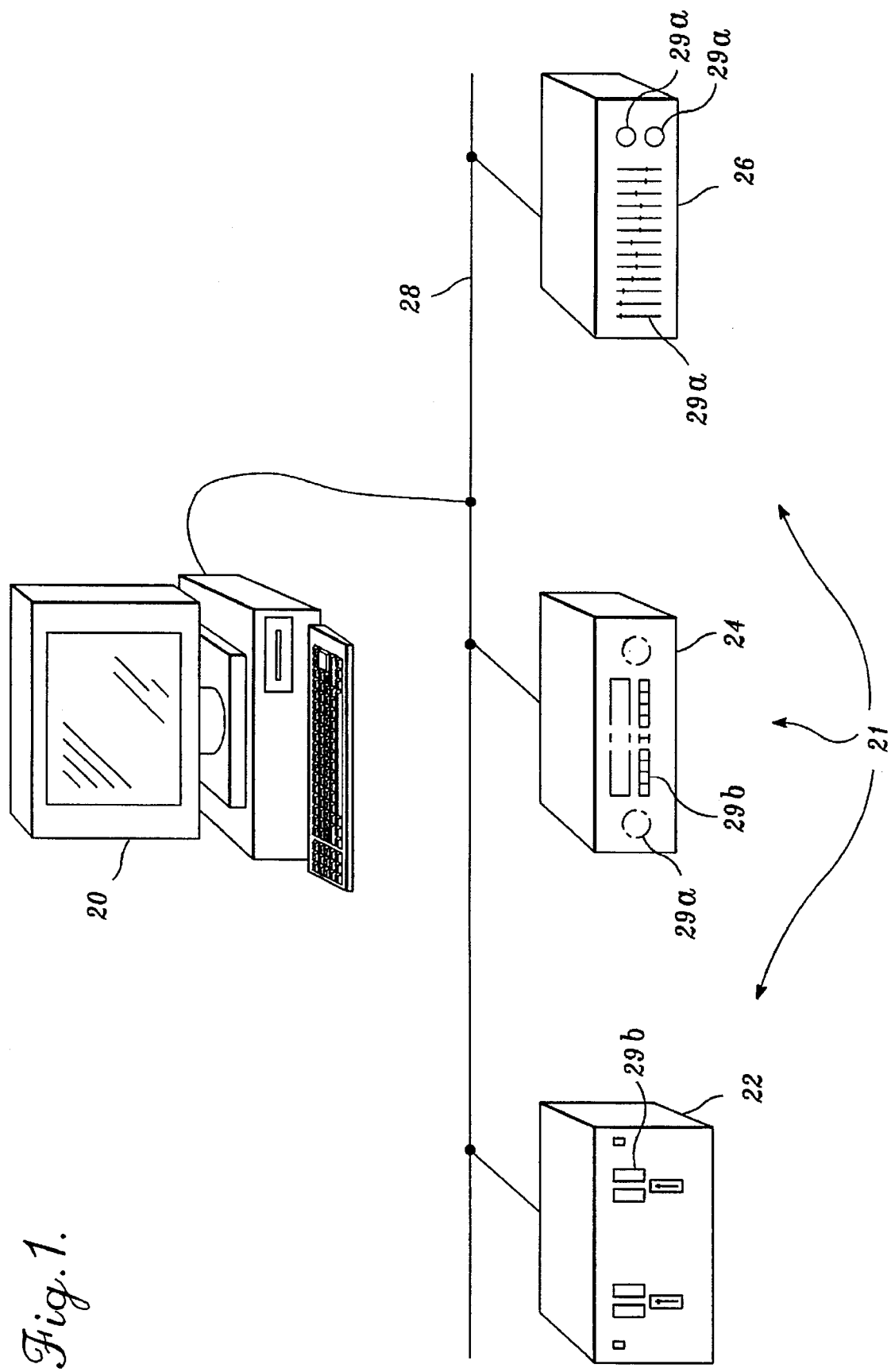
FIG. 1 is a pictorial diagram of a preferred embodiment of a graphical control system formed in accordance with the present invention that includes a personal computer, a bus network and a plurality of devices controlled by a graphical control program incorporated in the personal computer.

As will be better understood from the following description, the present invention is directed to a graphical control system for controlling non-computer system devices, wherein virtually any electronically controllable device equipped with the necessary interface hardware can be controlled. While the following description explains the invention in connection with musical system components, such as amplifiers and equalizers, it is to be understood that the invention can be used with other non-computer system devices, including a simple on/off switch for controlling a lamp. In addition, the invention easily accommodates non-computer system devices produced by various manufacturers. The invention employs a personal computer, a network, interfaces for connecting the computer and the non-computer system devices to the network, and a visual network operating system. While the preferred network is a bus network, such as a fiber optic bus, other types of networks, including non-wired networks can be employed in actual embodiments of the invention. Further, the network can simply be a point-to-point connection for connecting a computer to the interface of a single non-computer system device. The visual network operating system, which controls the operation of the computer and the interface is based on an object-oriented programming paradigm. In order to better understand the preferred embodiment of the invention described below, certain aspects of object-oriented programming paradigms that are relevant to the following discussion are first described.

The fundamental aspects of object-oriented programming paradigms are that objects can be organized into classes in a hierarchical fashion and that objects are interoperable. Classes are abstract generic descriptions of objects and their behaviors. A class defines a certain category or grouping of methods and data within an object. Methods comprise, procedures or code that operate upon data. Methods as applied to data define the behavior of the object. Refinement of the methods of the class is achieved by the creation of "sub-classes." In other words, a class can be thought of as a genus, and its subclass as the species. Subclasses allow the introduction of a new class into the class hierarchy, and inherit the behaviors of its superclass while adding new behaviors to the subclass.

An instance of a class is a specific individual entity, something concrete having observable behavior. An instance is a specific object with the behaviors defined by its class. Instances are created and deleted dynamically in an object-oriented programming paradigm. The class, however, is the broad, yet abstract, concept under which the instance belongs. The instance inherits all the methods of its class, but has particular individual values associated with it that are unique. There is only one location in the memory of a computer for the class. There may, however, be numerous instances of the class, each of which has different values and different physical locations in memory.

FIG. 1 illustrates a bus network 28 interconnecting a personal computer 20 and a plurality of non-computer system devices 21. The graphical control system of the present invention employing the object-oriented programming paradigm as described above allows a user to use the personal computer 20 to control the operation of the non-computer system devices 21 via bus network 28. For ease of illustration only three non-computer system devices 21 are shown in FIG. 1. The illustrated devices are a two-channel amplifier 22, a tuner 24 and a graphic equalizer 26. As will be appreciated by those of ordinary skill in the art from the following description, additional non-computer system devices can be connected to and controlled by personal computer 20 via the bus network 28, if equipped with the necessary interface hardware. Non-computer system devices may include video cameras, speakers, television sets, telephones, lamps, etc. Even simple light switches can form non-computer system devices. For illustrative purposes only, the devices shown in FIG. 1 are depicted as audio sound system devices, i.e., amplifiers, equalizers, tuners, etc.

In addition, those of ordinary skill in the art will recognize that additional personal computers equipped with the necessary hardware interfaces may be connected to bus network 28 and simultaneously used to the control non-computer system devices 21. In fact, any computer system including but not limited to portable computers, powerbooks, personal device assistants that is equipped with the necessary hardware interface to be connected to bus network 28 or any other coupling medium may be used control the non-computer system devices 21.

Inter-Device Communication

Figure 2:
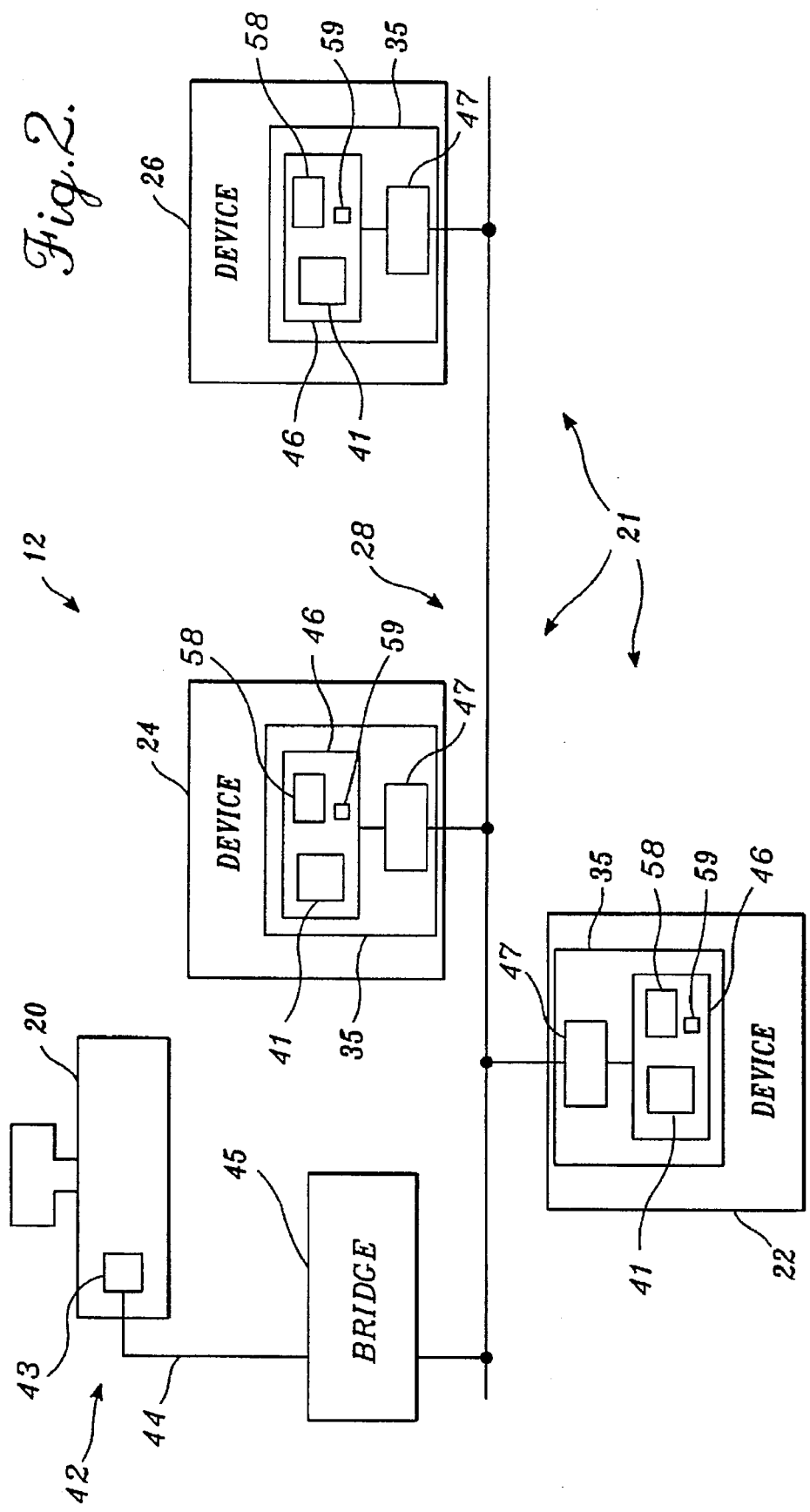
FIG. 2 is a block diagram of the personal computer, devices and bus network shown in FIG. 1.

As shown in FIG. 2, the personal computer 20 is connected to the network 28 by way of an RS232 interface 42 and a bridge 45. Standard personal computers typically include an RS232 card 43 and an RS232 cable 44 for communicating with external devices such as printers. RS232 is an interface standard that specifies signal voltage levels, etc. RS232 is also a byte-level communication protocol that specifies start bits, stop bits, etc. for sending bytes of data. Generally, a higher level communication protocol is used on top of the RS232 byte-level communication protocol, i.e., the personal computer 20 includes software defining a point-to-point communication protocol that is used on top of the RS232 byte-level protocol. The bridge 45 provides the interface between the RS232 cables 38 and the bus network 28, on which a network communication protocol is used.

Also depicted in FIG. 2 are the same non-computer system devices 21 shown in FIG. 1. Each non-computer system device 21 includes an interface 35 comprising an I/O board 47 and a processor board 46 which allow the devices to be directly connected to the network 28. The I/O board 47 is specifically constructed for use with the bus network configuration and a particular type of transmission medium, whereas the processor board 46 can be used with different communication configurations and transmission media.

The processor board 46 of interface 35 controls the communication of the devices 21 over the bus network 28. The processor board 46 includes a processor 41, an electronically erasable and programmable read-only memory (EEPROM) 58, and a random access memory (RAM) 59. One of ordinary skill in the art will recognize that interface 35 includes many more components than those shown in FIG. 2. Such other components are not described because they are conventional, and an understanding of them is not believed to be necessary to an understanding of the present invention.

When a non-computer system device 21 sends data, a command, or program code (collectively referred to herein as data), the processor board 46 of interface 35 housed in the device constructs a packet of data representing the relevant information. The processor board 46 determines the time at which the bus network 28 is available for sending the packet. The processor board 46 sends the packet to the I/O board 47 at the appropriate time, and upon receipt of the packet, the I/O board transmits the packet via the bus network 28 to personal computer 20. When a non-computer system device 21 receives data from a data source, such as the personal computer 20, the I/O board 47 receives the packet over the bus network 28, and sends the packet to the processor board 46. Upon receipt of the packet, the processor board 46 of interface 35 processes the packet and performs any appropriate function, possibly including sending a response packet back to the personal computer 20.

Typically, non-computer system devices come equipped with a variety of internal and external feature controls 29a and feature displays 29b that are used to control and monitor the operation of such devices, including but not limited to volume controls, channel selectors, power switches, input and output meters, etc. (in FIG. 1, internal controls and displays are represented by phantom lines, while external controls and displays are represented by solid lines). The processor boards 46 in the non-computer system devices 21 are further connected to these controls and displays to either control the devices directly or to control the devices in conjunction with other processors or controllers within the devices based upon packets received over the bus network 28.

The bus network 28 shown in FIGS. 1 and 2 can be formed of various coupling media such as glass or plastic fiber optic cables, coaxial cables, twisted wire pair cables, ribbon cables, etc. In the professional audio industry it is generally preferable to use fiber optic cables, as fiber optic cables are highly immune to electromagnetic interference and are capable of carrying signals over long distances without significant attenuation. As described herein, the bus network 28 represents fiber optic cables. Accordingly, the I/O board 47 of interface 35 shown in FIG. 2 is constructed for use with fiber optic cables.

Various network communication protocols can be used to communicate over the bus network 28. In one actual embodiment of the present invention, the network communication protocol used to communicate over the bus network 28 is of the type disclosed in commonly assigned U.S. Pat. No. 5,245,604, entitled "Communication System," the disclosure and drawings of which are specifically incorporated herein by reference. The network communication protocol described by U.S. Pat. No. 5,245,604 is referred to herein as the MediaLink protocol. The advantage of the MediaLink protocol is that it provides an upper limit on the amount of time it takes to communicate over the bus network 28. This is important in real-time environments such as a musical performance stage, where unpredictable delay would result in unacceptable distortion. As all network communication protocols must, the MediaLink protocol includes a network resource sharing and management algorithm such that only one device communicates over the bus network 28 at any one given time and such that each device has sufficient access to the bus network 28. While the MediaLink protocol and the bus network are presently preferred, it is to be understood that other network protocols and networks other than the type shown in FIGS. 1 and 2 may be used in actual embodiments of the invention, if desired.

Those of ordinary skill in the art will also recognize that a non-computer system device 21 may be connected to personal computer 20 in a point-to-point configuration by way of a cable so that a bridge 45 is unnecessary. For communicating with the personal computer 20, the device would include the interface 35 having processor board 46 and I/O board 47. However, the I/O board 47 would be specifically constructed for use with the point-to-point configuration and a particular type of transmission medium. Network and access management would obviously be unnecessary since the personal computer and the device are interconnected in a point-to-point configuration. In a point-to-point configuration the device is connected to the personal computer 20 by a RS232 cable. In addition, one of ordinary skill in the art would appreciate that the coupling medium could also include a radio frequency coupling medium or other coupling media.

Relevant Device Components

Figure 3:
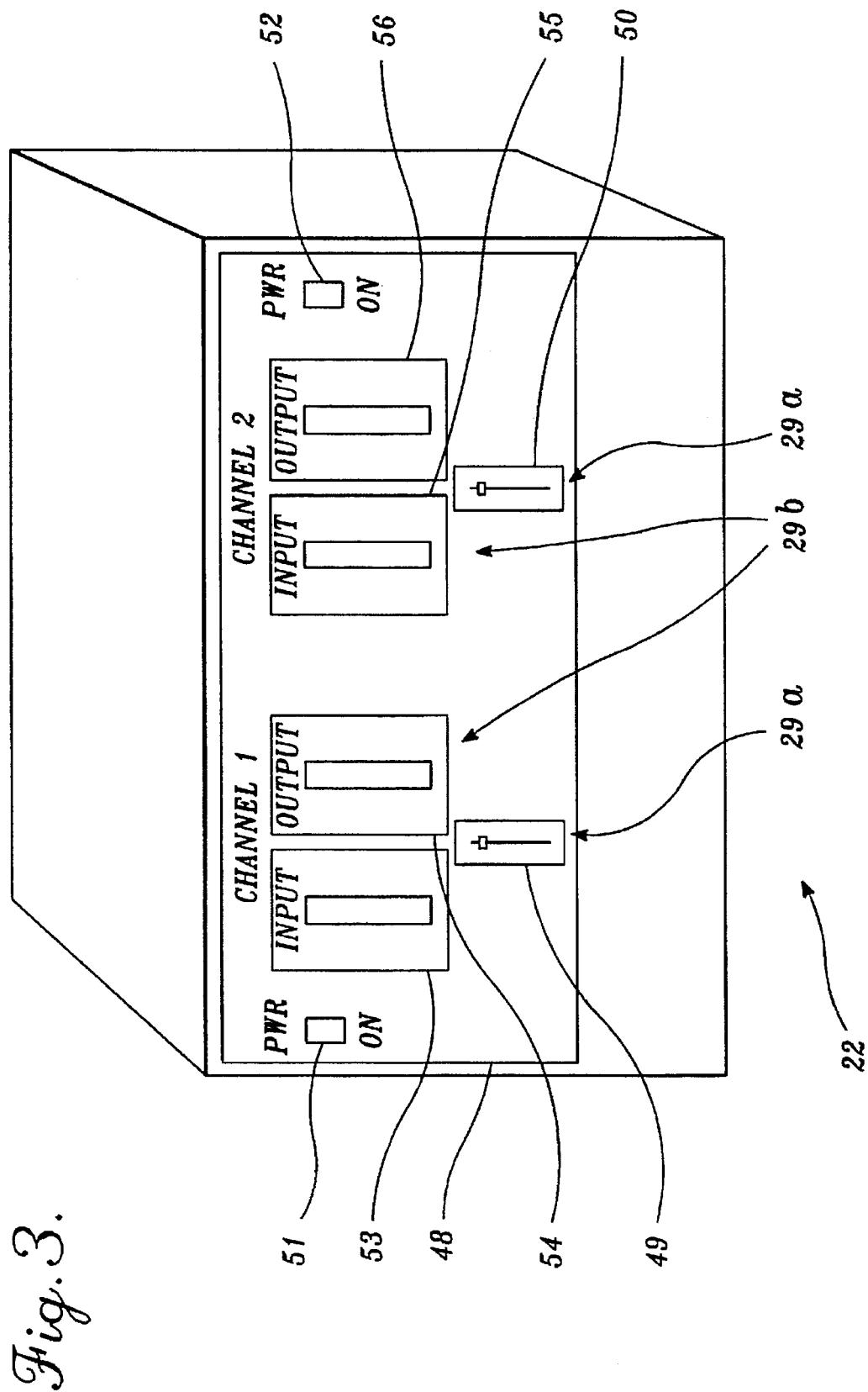
FIG. 3 is an isometric view of an amplifier.

A non-computer system device 21 connected to the personal computer 20 via the network 28 (FIG. 1) is shown in more detail in FIG. 3. In the illustrated embodiment of the present invention, the chosen non-computer system device 21 is the two-channel amplifier 22, which has a control and display panel 48 that contains a number of feature controls 29a, including a first fader 49, a second fader 50, a first power switch 51, a second power switch 52; and feature displays 29b, including a first input meter 53, a first output meter 54, a second input meter 55, and a second output meter 56. One of the faders, power switches and input and output meters is associated with each of the channels. As will be apparent to one of ordinary skill in the art from the present description of an exemplary preferred embodiment of the invention, the feature controls and displays shown in FIG. 3 should be construed as exemplary and not limiting. Other types of amplifiers could include various controls and displays (such as mute controls, fuse temperature gauges, etc.) other than or in addition to those shown in FIG. 3. Moreover, devices other than amplifiers include other types of controls and displays, depending upon the nature of each device.

The amplifier 22 shown in FIG. 3 is equipped with the hardware described above necessary to connect the amplifier 22 to the personal computer 20 via the network 28 so that data packets may be sent between the amplifier 22 and the personal computer 20. More specifically, the amplifier 22 is equipped with a processor board 46 and an I/O board 47. With respect to the processor board 46, the processor 41 preferably includes read-only memory (ROM) that stores program code for controlling the communication of the device with the personal computer 20 and with other devices. The EEPROM 58 is used by the processor 41 for controlling the functionality of the amplifier 22 and stores a portion of the visual network operating system. The RAM 59 is used by the processor 41 during operation to temporarily store some program code and data, including a class database containing instances of each class employed by the portion of the visual network operating system stored in the EEPROM.

Each of the feature controls 29a and feature displays 29b of the amplifier 22 governs a certain feature or aspect associated with the amplifier and can be represented by a numerical value. For example, the first fader 49 controls the volume produced by one of the channels of the amplifier 22. The value represented by the setting of the first fader is a number of decibels being output by the amplifier 22. The first power switch 51 is another example. The first power switch controls the application of power to the first channel of amplifier 22. When power is being supplied, the state of the power switch can be represented by the value "1". When power is not being supplied, the state of the power switch can be represented by the value "0".

The reading of each feature display 29b, such as first and second input meters 53 and 55, can be represented by a numerical value as well. Displays normally represent constantly fluctuating values. For example, first input meter 53 monitors the level of power being input into the first channel, designated Channel 1, of the amplifier. Since the power level constantly fluctuates, the numerical value representing the power level and hence, the second input meter reading, constantly fluctuate as well. In a similar manner, each control and display that governs an aspect of any device controllable by a graphical control system formed in accordance with the present invention can be represented by a numerical value.

Relevant Computer Components

Figure 4:
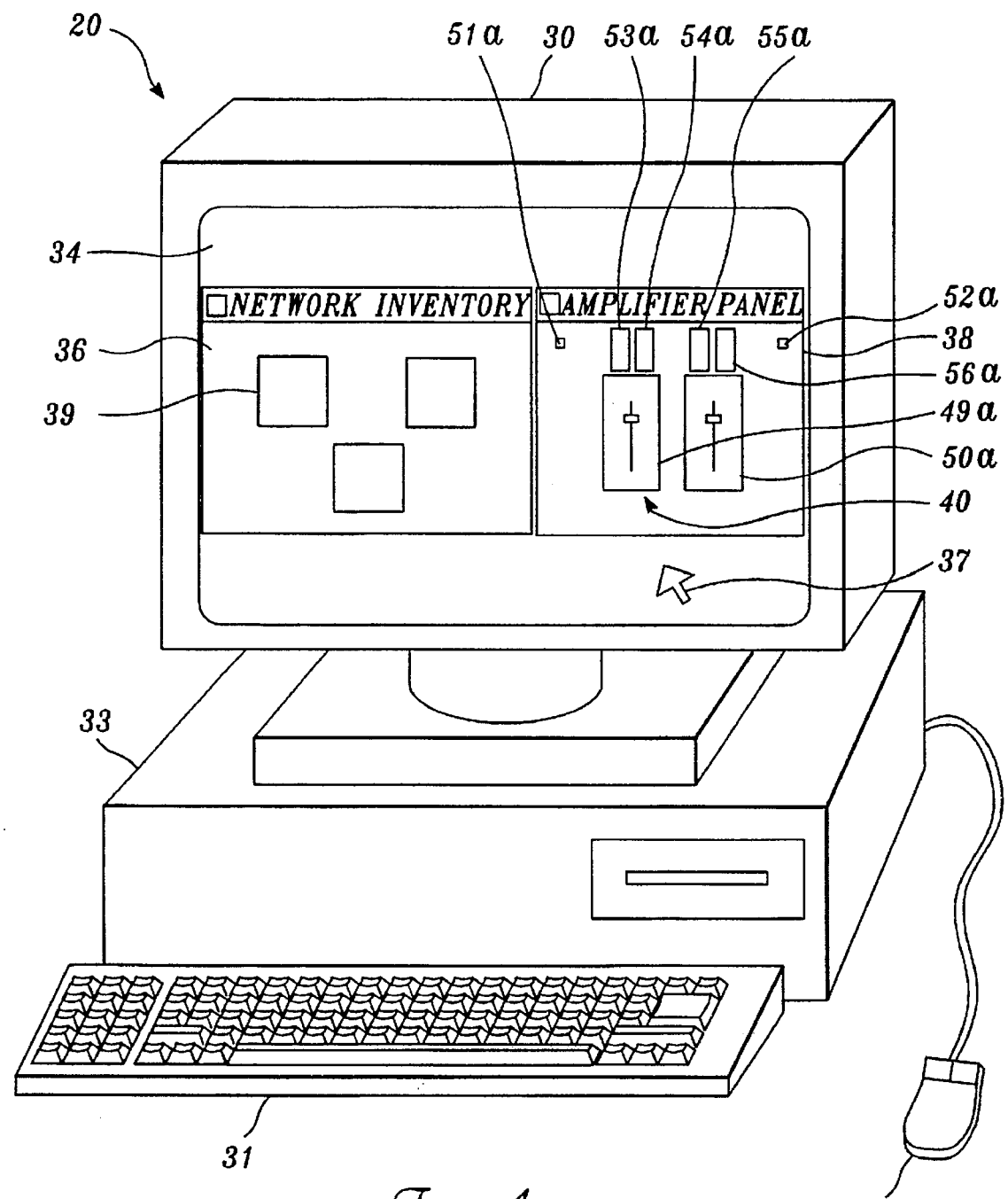
FIG. 4 is an isometric view of a typical personal computer suitable for use in the graphical control system shown in FIG. 1.

The personal computer 20 included in FIGS. 1 and 2 is shown in more detail in FIG. 4. The personal computer 20 includes a display or monitor 30, a keyboard 31, a mouse 32, and a main unit 33. The monitor 30 includes a screen 34 on which various elements of a graphical control system formed in accordance with this invention are displayed. The displayed elements include windows 36 and 38, and graphics cursor 37. One of the illustrated windows 36 is named "Network Inventory" and the other illustrated window 38 is named "Amplifier Panel." The Network Inventory window 36 contains three icons 39, each of which represents one of the non-computer devices 21 connected to the bus network 28. The Amplifier Panel window 38 represents the control panel 48 of the amplifier 22 and includes a plurality of visual device controls (VDCs) 40, each of which graphically represent a feature control 29a or feature display 29b used to control the amplifier 22. For ease of understanding, the same reference numbers plus the letter "a" are used in FIG. 4 to refer to the visual device controls (VDCs) as were used to refer to the feature controls and displays shown in FIG. 3.

Figure 5:
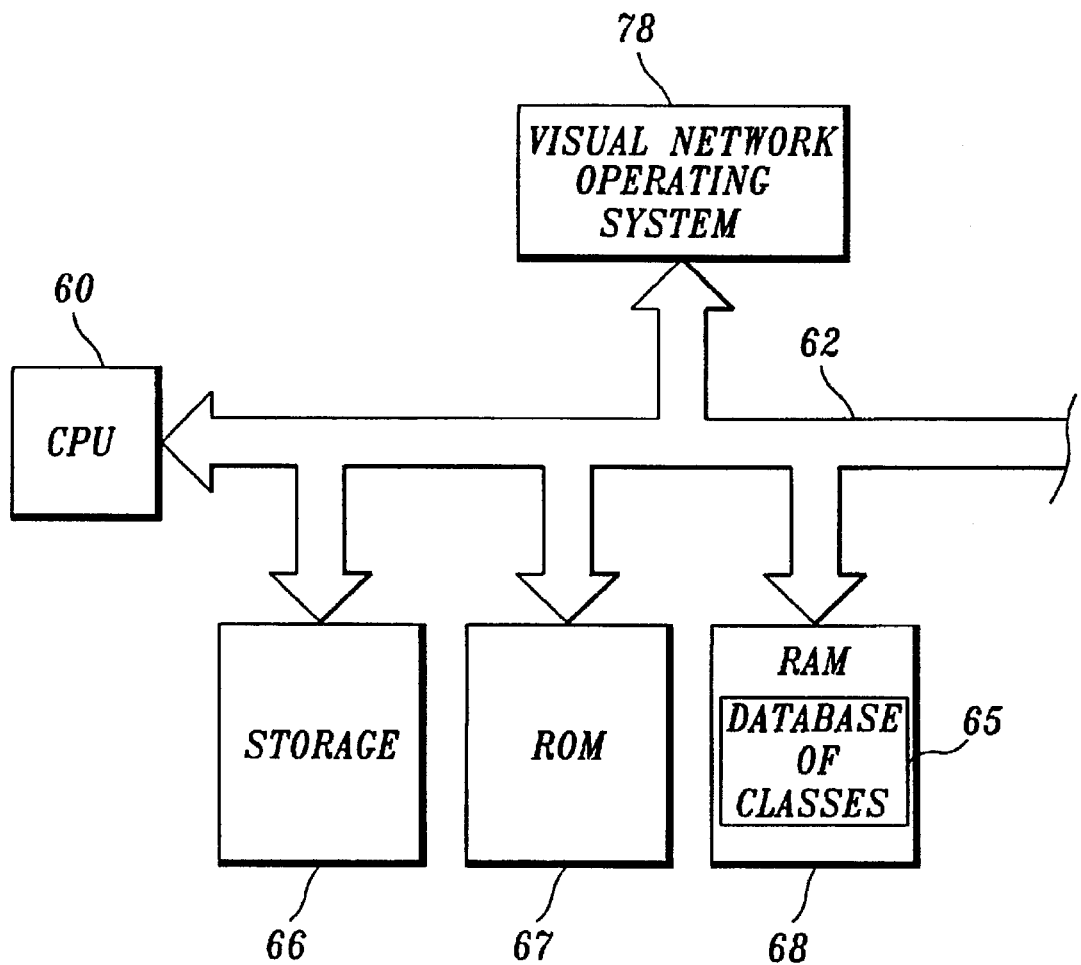
FIG. 5 is a block diagram of several components of the personal computer shown in FIG. 4 that are used by the graphical control system of the present invention.

For purposes of explaining the operation of the graphical control system of the invention, several of the key components of the personal computer 20 are illustrated in FIG. 5. It will be apparent to those of ordinary skill in the art that personal computer 20 includes many more components than those shown in FIG. 5. Such other components are not described because they are conventional, and an understanding of them is not necessary to an understanding of the present invention.

FIG. 5 shows a CPU 60 coupled by a bus 62 to a read-only memory (ROM) 67 and a random access memory (RAM) 68. The CPU responds to program instructions stored in the ROM 67 and temporarily in the RAM 68. The computer 20 also includes a permanent storage device 66, such as a hard disk drive or a floppy disk drive, that is connected to the CPU by the bus 62. The CPU 60 is controlled by a portion of the visual network operating system 78 functionally shown as coupled to the bus 62, but actually stored in a suitable one of the memories. A class database 65 containing instances of each class employed by the visual network operating system 78 is stored in the RAM 68. In addition to a number of functions to be described in the following discussion, the visual network operating system 78 provides the CPU with various conventional platform operating services, including but not limited to network polling, task scheduling, loading and saving data and objects, massive object and data manipulation, object creation and disposal, and database traversal.

Figure 6:
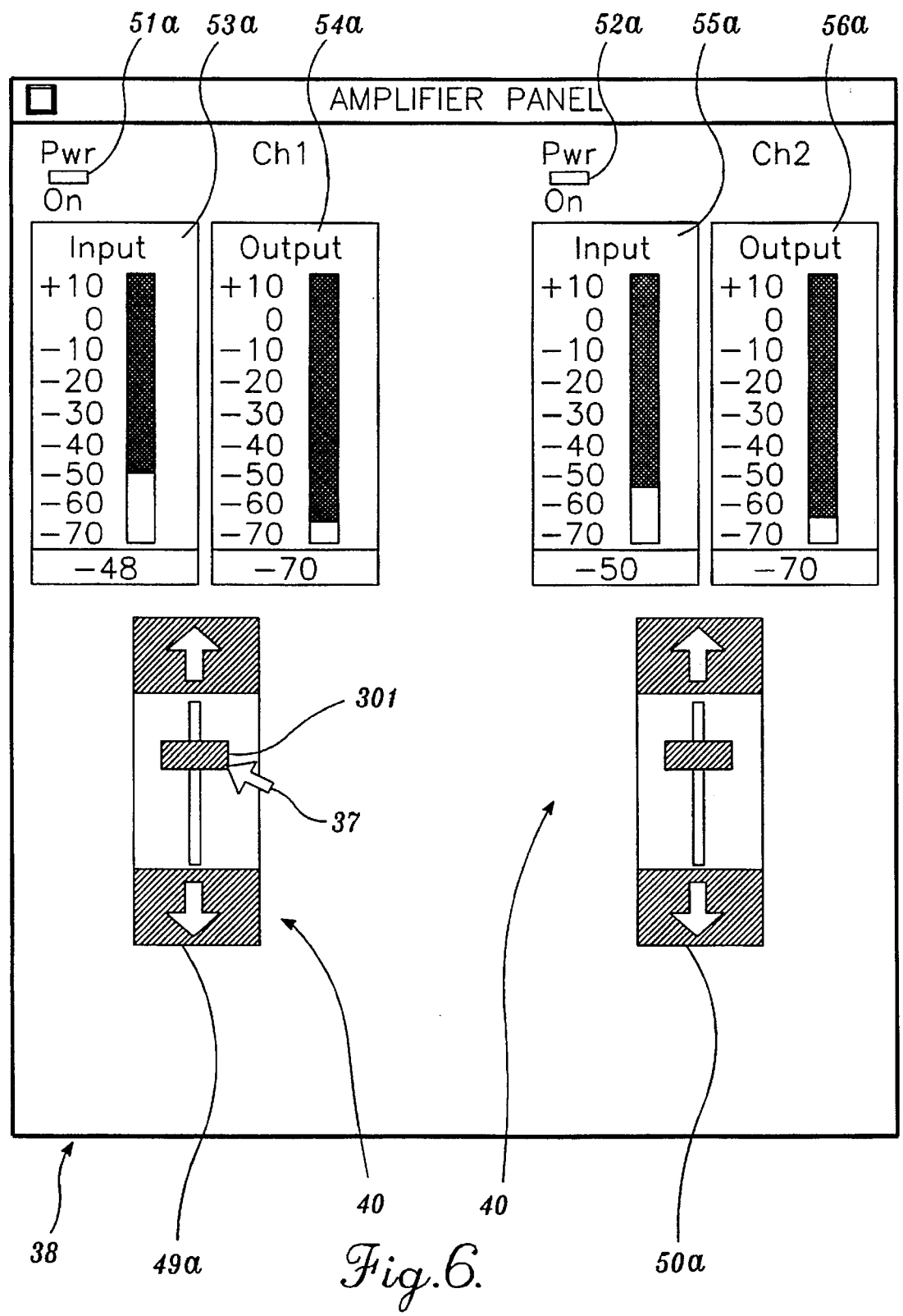
FIG. 6 illustrates a typical Amplifier Panel window produced by the graphical control system shown in FIG. 1.

As illustrated in FIG. 4, in one actual embodiment of the present invention, the graphical control system produces the Amplifier Panel window 38 on the screen 34 of the personal computer 20. FIG. 6 shows the Amplifier Panel window in much greater detail. The Amplifier Panel window 38 is a predefined graphical control display of the control panel 48 of the amplifier 22 shown in FIG. 3. Consequently, the Amplifier Panel window 38 contains a VDC 40 for each feature control 29a or feature display 29b of the amplifier 22. Since each VDC 40 graphically represents a control or display of the amplifier, each VDC 40 visually represents and controls the value actually represented and governed by its control 29a or display 29b counterpart. That is, the VDCs 40 may either exactly replicate external and internal feature controls 29a and displays 29b on screen 34 that a user would find on the amplifier 22, or the VDCs may functionally represent such controls and displays. For example, a rotary knob on the amplifier 22 may be functionally represented by a VDC in the form of a slide display; or a VDC in the form of a linear scale or number display may be used to functionally represent a dial display. It will be appreciated by those skilled in the art that for each device 21 on the network 28, the graphical control system of the present invention produces a predefined graphical control display that represents the control panel of the device, wherein the graphical control display contains a VDC 40 for each control 29a and display 29b of the device.

In addition to graphically representing internal and external feature controls 29a and displays 29b, each VDC 40 visually represents and controls the value actually represented and governed by its control or display counterpart. Using the previous examples, the VDC 49a that graphically represents the first fader 49 of the amplifier 22, controls the volume the amplifier by producing a value represented by the setting of the VDC 49a that is the number of decibels being output by the amplifier. The VDC 51a that graphically represents the first power switch 51 of the amplifier 22 controls a binary signal that represents the value "1" when power is being supplied, and the value "0" when power is not being supplied. The VDC 53a that graphically represents the first input meter 53 of the amplifier represents and monitors the value associated with the power level being input to the device at any given instant in time.

Since VDCs 40 represent the controls 29a and displays 29b of a device 21, it will be understood that the graphical control system of the present invention eliminates the need for external, manually operable controls and displays. In one actual embodiment of the present invention, the devices 21 on the network 28 are fully controlled by the personal computer 20 and do not include any external, manually operable feature controls and feature displays whatsoever. The elimination of external feature controls and feature displays reduces the cost and difficulty of manufacturing non-computer system devices. While the invention can be implemented in a way designed to eliminate the need for non-computer system devices to have external controls and displays, it is to be understood that in some embodiments of the invention it may be desirable to include external controls and displays.

As shown in FIG. 6, other VDCs 49a, 50a and 53a graphically represent the first fader 49, the second fader 50 and the first input meter 53 of the amplifier 22 shown in FIG. 3, respectively. In addition, the second input meter 55 is graphically represented by another VDC 55a, while the first and second output meters 54 and 56 are graphically represented by still other VDCs 54a and 56a, respectively. Finally, still other VDCs 51a and 52a represent the first and second power switches 51 and 52, respectively.

The VDCs 40 differ from the icons 39 shown in FIG. 4 in that each icon is a static graphical representation of an entire device itself. Merely selecting an icon using the mouse does not control the feature controls 29a and displays 29b of the device. In contrast, a VDC 40 is a dynamic graphical replica or representation of the feature controls 29a and feature displays 29b of a device 21, having the same properties and characteristics of its control or display counterpart. Therefore, in order to initiate execution of one of the controls or displays of the amplifier 22 shown in FIG. 3 using the graphical control system of the present invention, the user manipulates cursor 37 using the mouse 32, such that the cursor is positioned over the desired control VDC 40 in the Amplifier Panel window 36. One of ordinary skill in the art would appreciate that any conventional graphical control device, such as a track ball, joystick, touch screen, etc. may be used instead of the mouse. For example, the VDC 49c represents first fader 49 and is used to control the volume of Channel 1 of the amplifier 22. Hence, the value represented by the setting of this VDC 49a is the volume being output by the amplifier, which may be displayed in decibels. To increase the volume of Channel 1 of the amplifier using the first fader VDC 49a, the user manipulates the cursor 37 using the mouse 32, such that the cursor is positioned over a visual control element or device, "knob" 301 that forms part of the first fader VDC 49a. The user then "grabs" the knob 301 using a predefined function such as depressing a button of the mouse and moves the knob upwardly by correspondingly moving the mouse. The user then releases the knob 301 by releasing the button on the mouse. As a result, the first fader VDC 49a is graphically manipulated and reset, resulting in a change to the value represented by the first fader VDC 49a. This change in value is then communicated by the graphical control system of the present invention to the amplifier 22, where the graphical control system further causes the amplifier interface 35 to adjust the Channel 1 volume controlled by first fader 49 so that it corresponds to the change in value.

As a corollary, the first fader 49 also may be effectuated manually, electrically or by control of another personal computer connected to the bus network 28. For example, if the Channel 1 volume of the amplifier 22 is increased by manually operating the first fader 49, a change in the value represented by the first fader results. The graphical control system communicates the change in value to the personal computer 20 so that the visual device control element or knob 301 of the first fader VDC 49a is regenerated in a manner that visually corresponds to the change in value.

Some of the VDCs 40 shown in FIG. 6 represent feature displays that are constantly being updated. For example, the first input meter 53 monitors the power level input into Channel 1 of the amplifier 22 at any given instant. The value representing power level that is displayed by the first input meter 53 is constantly fluctuating. Hence, the graphical control system constantly communicates this change in value to the personal computer 20. The platform operating services provided by the VNOS 78 constantly poll the bus network 78 for such changes in value. As a result, when the first input meter VDC 53a is regenerated, its visual device control element or display "value" changes in accordance with the actual fluctuation of the first input meter 53. As a result, a user can monitor the first input meter 53 of the amplifier 22 from the screen 34.

The element of the graphical control system that controls the personal computer system 20 and the device interface 35 such that the VDCs 40 replicate and control the feature controls 29a and displays 29b is the visual network operating device 78, which is described next.

The Visual Network Operating System

Figure 7:
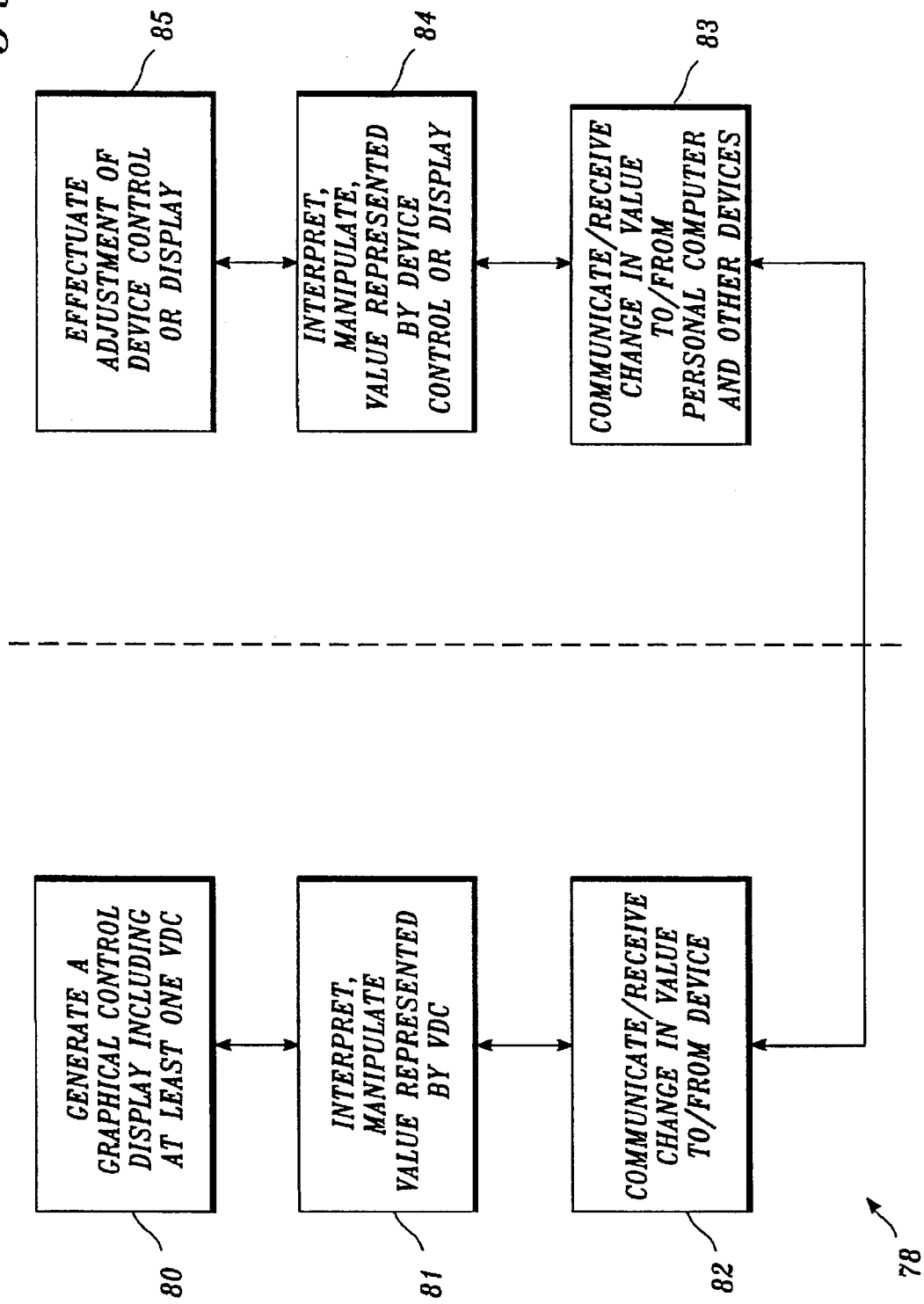
FIG. 7 is a flow chart illustrating the functions provided by the graphical control system shown in FIG. 1.

FIG. 7 is a flow chart illustrating the control and monitoring functions performed by the visual operating system (VNOS) 78 of the present invention and the order in which these functions are performed. As noted above, VNOS 78 is a distributed operating system that is partially stored in the personal computer 20 and partially stored in the interfaces 35 of the devices 21. The major portion is stored in the personal computer. Blocks 80, 81 and 82 represent the functions of VNOS that control the operation of the personal computer 20 and blocks 83, 84 and 85 represent the functions of VNOS that control the interface 35 of a device 21.

Beginning at block 80, VNOS generates a graphical control display upon the screen 34 of the personal computer 20 that contains a number of VDCs 40. As previously described, each VDC graphically represents a corresponding feature control 29a or feature display 29b of one of the devices 21 to be controlled (FIG. 1). In addition to display graphics, each VDC represents a particular value associated with a corresponding control 29a or display 29b. Whenever the user manipulates a VDC using the mouse 32, or some other control device, in the appropriate manner, a change in the associated value results. Hence, in block 81, VNOS interprets the value, which is then stored in RAM 68 of the personal computer 20. In some embodiments of the invention, VNOS may further manipulate and change the value before storing it. At block 82, VNOS communicates the change in the value associated with the feature control or display to the related device 21 via the bus network 28.

Proceeding to block 83, at the device interface 35, VNOS receives the change in value associated with the feature control 29a or display 29b. At block 84, VNOS interprets and stores the change in value in the RAM 59 located in the interface 35. Again, in some embodiments VNOS may further manipulate and change the value before storing it. Finally, at block 85, VNOS causes the interface 35 to adjust the corresponding control or display in accordance with the change in value stored in the interface RAM.

While VNOS 78 of the graphical control system of the present invention is designed, in part, for use in the forward direction beginning at block 80 and preceding to block 85, in some embodiments of the invention it may be desirable for the device 21 to be manually operated by a control 29a located on the device or by another computer. In addition, a control 29a or display 29b may be automatically and electrically adjusted by a command generated internally, as is the case with meters and temperature gauges that monitor constantly fluctuating values. In such cases, the order in which the VNOS functions are performed in FIG. 7 is reversed so that communication begins at block 85 and proceeds to block 80. In this case, a change in value resulting from an adjustment of a feature control or display at the device 21 is sent from the device to the other devices and to the personal computer. As a result, the VDC representing the control or display on the screen 34 of the personal computer is regenerated in accordance with the change in value.

The Object-Oriented Programming Paradigm of VNOS

In order to accomplish the functions generally depicted in FIG. 7 and described above, VNOS 78 uses an object-oriented programming paradigm to represent non-computer system devices 21. One fundamental aspect of object-oriented programming paradigms is that objects can be organized into classes in a hierarchical fashion. Classes are abstract generic descriptions of objects and their behaviors. A class defines a certain category or grouping of methods and data within an object. Methods provide the "intelligence" of a class and comprise procedures or codes that operate upon the data. Methods as applied to data define the behavior of an object. This concentration of intelligence in the methods of object classes is essential in object-oriented systems. It permits large-scale maintenance efforts, since the methods or intelligence of objects is inherited from their class. So, effecting a change once in the methods of a class will automatically effect changes in the methods of all the objects of that class and its subclasses.

Figure 8:
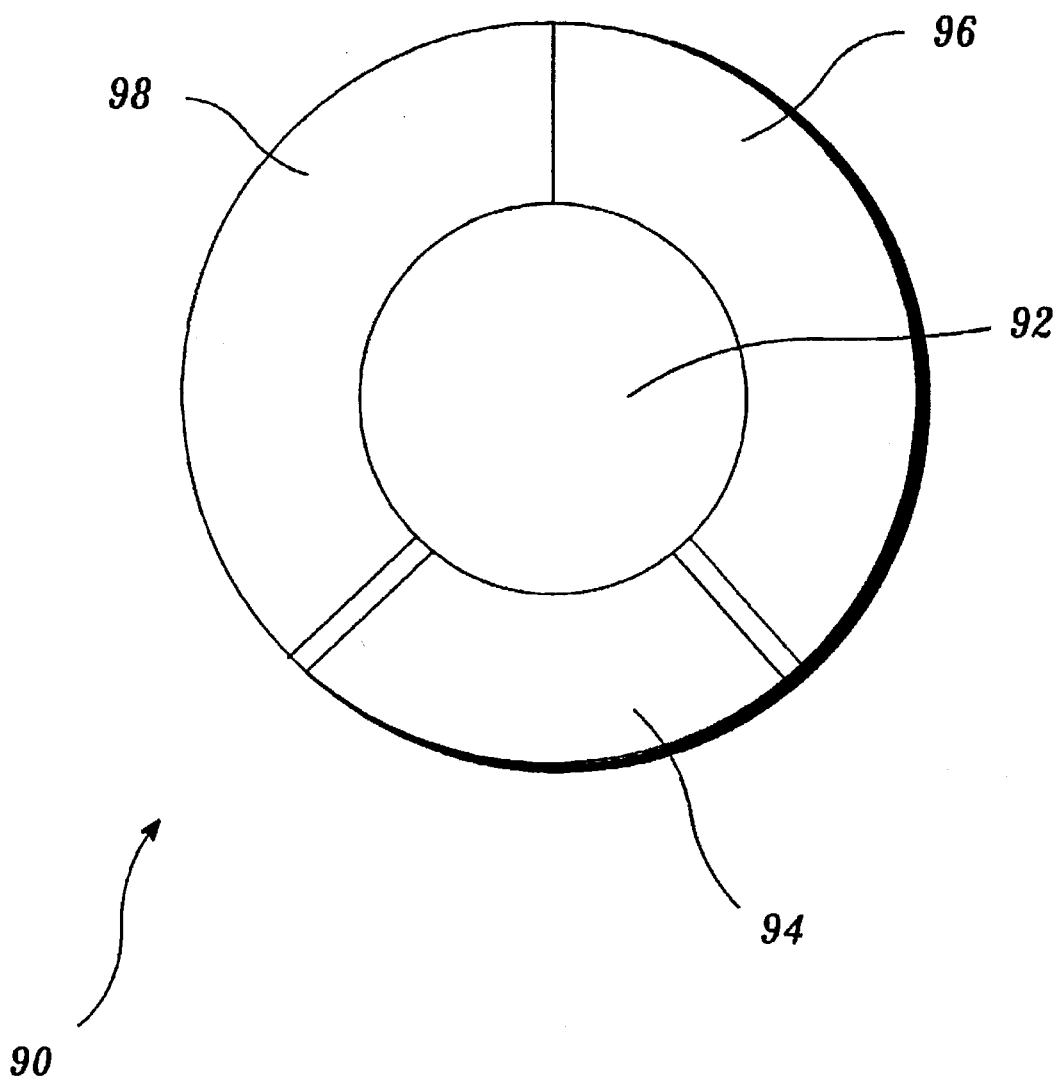
FIG. 8 is a graphical representation of an object implemented in the graphical control system shown in FIG. 1.

As shown in FIG. 8, an object 90 can be modeled by a doughnut, with data 92 being located in the center of the doughnut. The data 92 represents various attributes of the object 90 including but not limited to addresses in memory for the instances of the object, a database containing more objects, and pointers to other objects. Around the outer part of the doughnut are two regions denoted generic methods 96 and 98, and another region denoted class-specific methods 94, which are employed by the graphical control system of the present invention to interact with the data 92.

Another fundamental aspect of object-oriented programming is that objects are interoperable. In this regard, the generic methods 96 and 98, and class-specific methods 94 that interact with the data 92 totally surround the data and, in a sense, encapsulate the data. Only the methods in the outer part of the doughnut are allowed to know anything about the data. The methods isolate the encapsulated data from other parts of the system making the object interoperable with other objects regardless of the data contained by those objects. The user is capable of modifying the system as new devices appear or disappear on the network, by merely changing the data, since an object is interoperable and need only be concerned about how it represents the data for which it is responsible.

Yet another fundamental aspect of object-oriented programming is that objects are composable, i.e., the methods surrounding the data may be predefined and subsequently modified. Generic methods 96 and 98 around the outer part of the doughnut are generic methods present in all objects of a class. Generic methods 96 are generally those used to translate the data 92 into a linear, textual representation so that the data can be directed to and from a text file in storage 66 of the personal computer 20 by the platform operating services of VNOS 78. Generic methods 96 are employed when the user requests a full state save or restoration of all objects upon shut-down or power-up of the personal computer. Generic methods 96 are also referred to as "interpret and describe" methods. Generic methods 98 provide for communication between objects including methods for generating pointers to other objects and methods for sending messages to other objects.

As opposed to generic methods 96 and 98, class-specific methods 94 are unique for a particular class. The class-specific methods 94 usually provide the logic that implements special behaviors of the object 90 that are unique to the particular class.

Figure 9A:
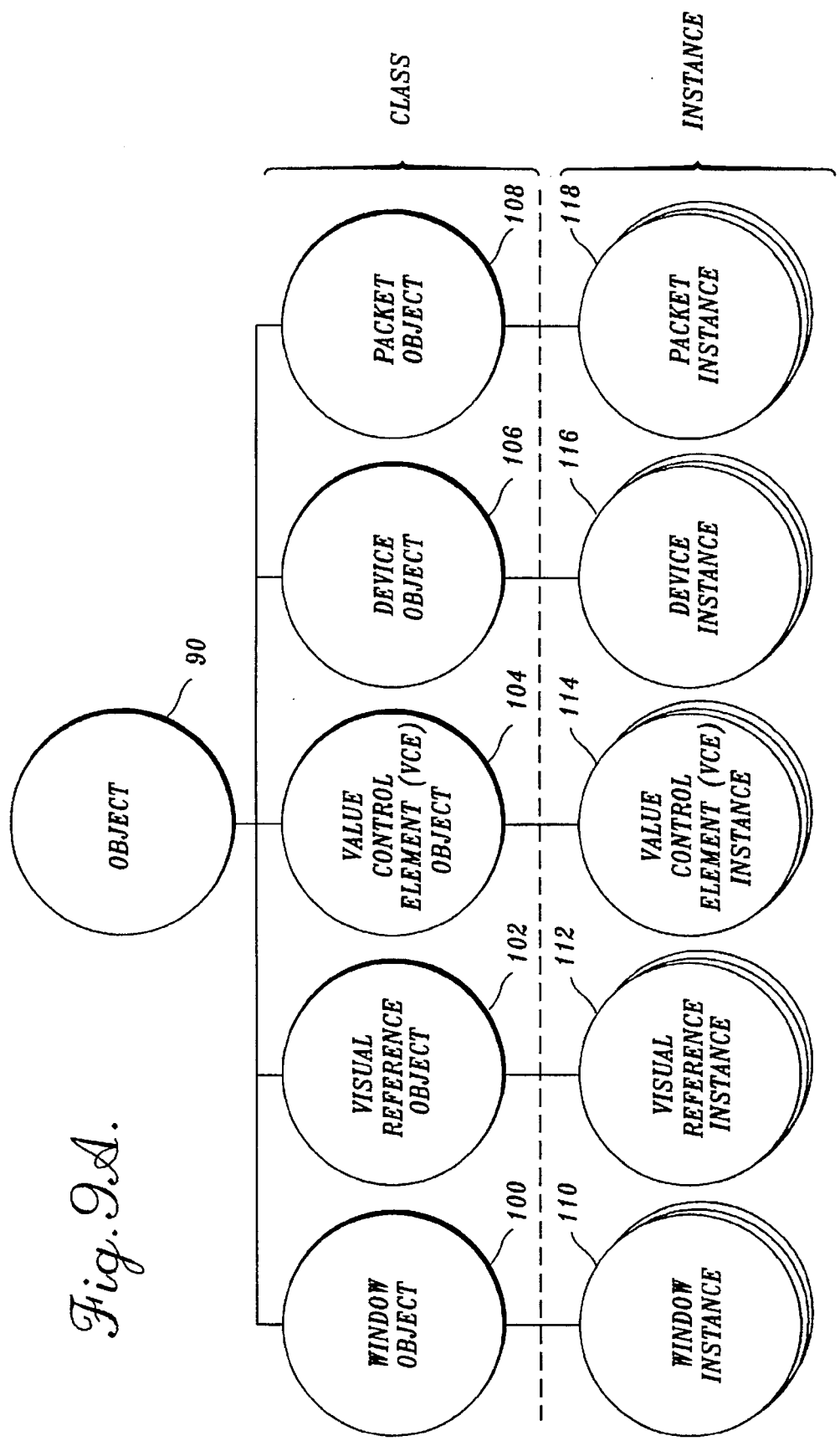
FIG. 9A is a hierarchical diagram of an object-oriented programming paradigm implemented in the graphical control system shown in FIG. 1.

FIG. 9A shows the object-oriented programming paradigm from a class hierarchy perspective as employed by the portion of VNOS 78 stored in the personal computer. In an object-oriented programming paradigm, objects are categorized into classes, where a class defines a category of methods and data within its objects. Methods as applied to data define the behavior of an object. An instance is a specific object with the behaviors defined by its class. The object-oriented programming paradigm employed by the portion of VNOS 78 stored in the personal computer 20 primarily employs five different objects—a window object 100, a visual reference object 102, a value control element (VCE) object 104, a device object 106 and a packet object 108. Each object is shown as a class beneath the class "object" 90. Briefly, window objects 100 contain the data and methods necessary for displaying a window on a computer screen 34; visual reference objects 102 contain the methods and data necessary for generating an icon 39 or VDC 40 of a window object; value control element (VCE) objects 104 contain the value represented by a VDC and the methods for manipulating that value; device objects 106 contain the methods and data for communicating with a particular type of non-computer system device 21 and for managing a graphical control display of that device; and packet objects 108 contain the methods and data for communicating data between a device 21 and the computer 20 via the bus network 28.

As will be readily apparent to one of ordinary skill in the object-oriented programming art, the window, visual reference, VCE, device and packet objects (which are shown as classes in FIG. 9A) may be subdivided into further subclasses. For example, device object 106 may be divided into subclasses of amplifiers, equalizers, CD players, etc. Each of these subclasses may then be subdivided again. For example, the subclass of amplifiers may be divided into subclasses of amplifiers wherein each subclass comprises amplifiers produced by a particular manufacturer.

FIG. 9A also illustrates the relationship between object classes and instances (i.e., specific objects) in the object-oriented programming paradigm. As previously described, each object is shown as a class beneath the class "object." Further, each class can generate one or more instances. Amplifier Panel window 38 in FIG. 6 is an example of a window instance 110 of window object 100, wherein window object 100 is shown as a class beneath the class "object."

A VDC 40 contained in a window instance 110, such as the first fader VDC 49a in Amplifier Panel window 38 shown in FIG. 6 is represented by a visual reference instance 112 of visual reference object 102. The visual reference object 102 is also shown as a class beneath the class "object." Each VDC in a window instance 110 is represented by its own visual reference instance. Visual reference instance 112 may have associated with it a value control element (VCE) instance 114. If so, a VCE instance 114 is generated when a VDC 40 is displayed in the window instance 110. The VCE instance 114 contains the particular value or change in value represented by the VDC. For example, if the first fader VDC 49 of the amplifier 22 is set at 6 decibels, the VCE instance 114 will contain the value 6. If the first fader VDC 49a is reset to 8 decibels, then the VCE instance 114 will be changed to the value 8.

Each VCE instance 114 is associated with a device instance 116. An example of a device instance 116 is the amplifier 22. A device instance will exist for each device 21 on the network. Furthermore, each device instance 116 may be associated with a packet instance 118. Each packet instance 118 represents either an incoming or outgoing packet that is communicated between a device 21 and the personal computer 20 via the bus network 28.

Figure 9B:
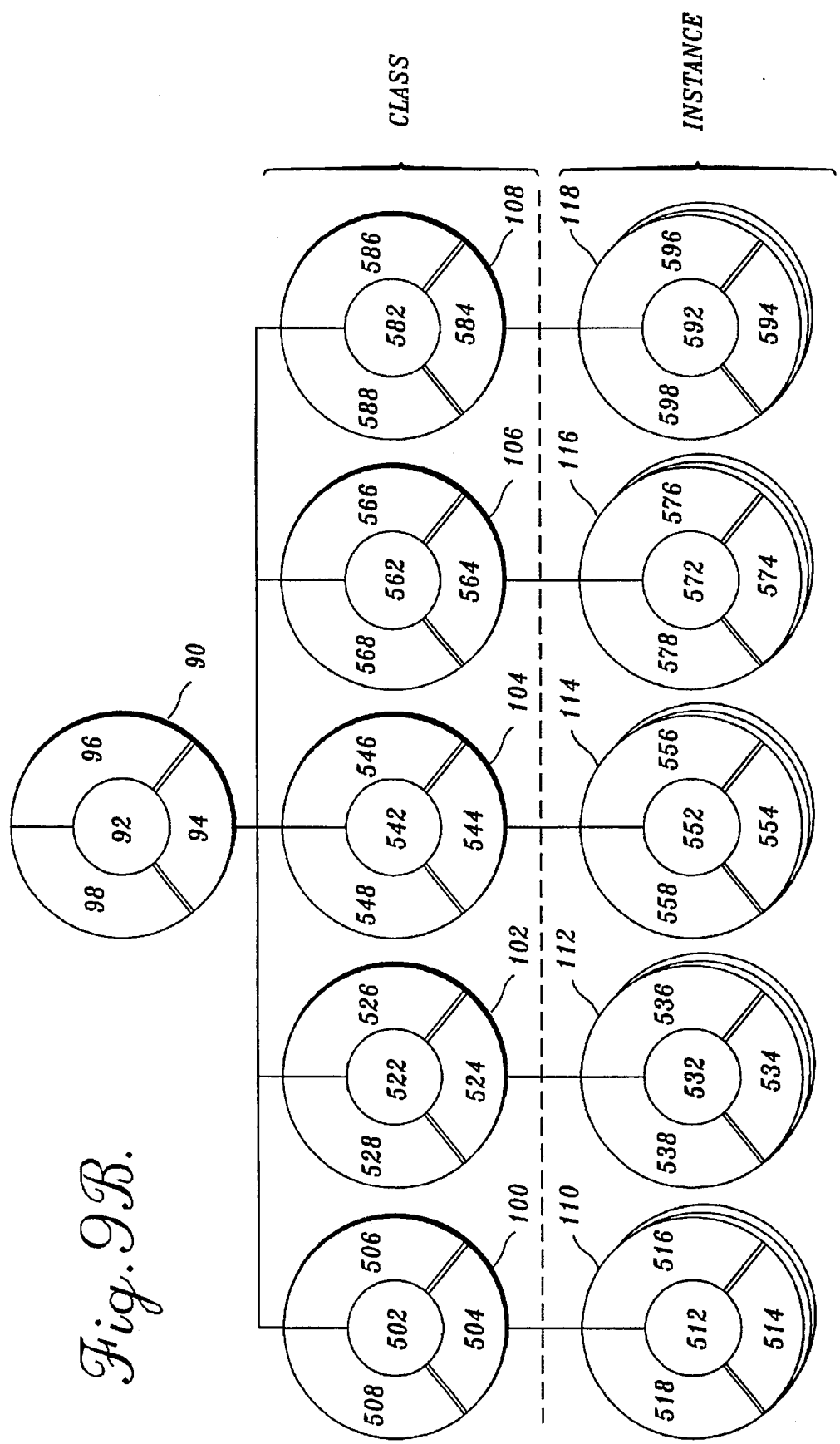
FIG. 9B illustrates the methods and data provided by the object-oriented programming paradigm depicted in FIG. 8.

A more detailed description of each of the five objects employed by VNOS 78 follows. As illustrated in FIG. 8 and described above, object 90 contains data 92, generic methods 96 and 98, and class-specific methods 94. Each of the five objects employed by VNOS 78 and shown as a class beneath the class "object" 90 inherits data 92, generic methods 96 and 98, and class-specific methods 94, while adding new data and methods. FIG. 9B illustrates the new and inherited methods and data contained by each of the five objects depicted in FIG. 9A. Since the methods and data within each of the five objects comprises methods and data inherited from class "object" 90 plus new methods and data, the reference numbers used in FIG. 9B to identify the methods and data within each of the five objects mirror those used to identify the methods and data of object 90.

Now referring to FIG. 9B, each window object 100 provides the data and methods necessary for displaying a window on screen 34. The data 502 contained by a window object 100 comprises a database of visual reference objects 102 and list of pointers to related visual reference objects, VCE objects, device objects, and other window objects. As noted above, the generic methods 506 and 508 contained in a window object 100 will comprise inherited generic methods 96 and 98 from the class "object" 90 and new methods. Consequently, the generic methods 506 translate window object data 502 into a linear, textual representation that is directed to a text file located in the storage 66 of the personal computer 20. Meanwhile, the class-specific methods 504 contained in a window object 100 provide the graphical appearance of a window as defined by that computer's particular windowing environment, such as the Apple Mac OS or Microsoft Windows. In addition, the class-specific methods 504 provide for the organization of the icons 39 and VDCs 40 within the window object 100. The generic methods 508 of a window object provide communication between the remaining four classes of objects.

The purpose of a visual reference object 102 is to generate visible screen entities such as icons 39 or VDCs 40 in the window objects 100. The class-specific methods 524 of a visual reference object 102 generate the graphical general appearance of an icon 39 or a VDC 40. The class-specific methods 524 of a visual reference object 102 may also be used to change a style or functional representation of a VDC 40. Using a previous example, class-specific methods 524 provided by a user may cause a VDC originally in the form of a dial display to be regenerated into a linear scale or number display. Further, class-specific methods 524 provided by the user can change the type, color, shape, size, orientation or operation thresholds of a VDC 40. change a style or functional representation of a VDC 40. Using a previous example, class-specific methods 524 provided by a user may cause a VDC originally in the form of a dial display to be regenerated into a linear scale or number display. Further, class-specific methods 524 provided by the user can change the type, color, shape, size, orientation or operation thresholds of a VDC 40. A user simply loads or "drops in" code comprising the class-specific methods provided by the manufacturer into a visual reference object 102 in order to generate the custom VDC. Further details concerning the automatic regeneration of a VDC's graphical dimensions is provided below.

Finally, the data 522 of a visual reference object 102 contains a list of pointers to other window objects, VCE objects, device objects, and other visual reference objects having the same origin. The generic methods 526 of a visual reference object 102 provide for the translation of the data 522 of the visual reference object, while the generic methods 528 provide communication between the visual reference object 102 and the remaining objects.

The VCE object 104 serves to interpret, store and perhaps further manipulate the value represented by a VDC 40. The data 542 of a VCE object 104 comprises the value represented by the VDC. Consequently, when a VDC is manipulated by the user to cause a change in the displayed value, the VCE object data 542 will change in a corresponding manner. The value contained in the VCE object data 542 may undergo further manipulation as provided by the class-specific methods 544 of the VCE object 104. For example, the class-specific methods 544 may further change the value by executing a scaling function on the value or converting a numerical value to a textual value. As with visual reference objects 102, a user may load code comprising the class-specific methods into a VCE object 104 using the platform operating services provided by the portion of VNOS 78 stored in the computer 20.

As is the case with every other object, the VCE object data 542 includes a list of pointers to related window, visual reference, VCE, device and packet objects and generic methods 546 providing for communication between these objects. However, unlike the window object 100 and the visual reference object 102, the VCE object itself does not appear on the computer screen 34. Hence, class-specific methods 544, which would normally control a VCE object's appearance are not present.

In one of the preferred embodiments of VNOS 78, the data 542 and class-specific methods 544 of VCE objects 104 can be used to define "master" and "slave" VCE objects, wherein a master VCE object can be used to control a slave VCE object. In this embodiment, VCE object data 542 comprises a list of pointers to slave and master VCE objects, while the class-specific methods provide logic for manipulating slave and master VCE objects. Further details of this aspect of the invention are provided below.

A device object 106 contains the methods and data for communicating with a particular type of device 21 and for managing a graphical control display, i.e., a graphical representation of that device in a window. The data 562 of a device object 106 contains a database of related VCE objects 104 and list of pointers to the other device objects in the same class. Generic methods 566 of a device object 106 provides for data translation, while generic methods 568 of a device object provide for communication between the device object and the four remaining objects. Class-specific methods 564 of a device object provide for special window, packet, and VCE object handling and for managing the graphical control display or graphical representation of a device 21 in a window, such as Amplifier Panel window 38 shown in FIG. 4.

A packet object 108 contains the methods and data for generically communicating between a device 21 and the computer 20 via the bus network 28. In addition, the data 582 of a packet object 108 contains a list of pointers to related VCE objects 104 and device objects 106. The data 582 of a packet object includes device information to be transmitted over the network in a data packet. Hence, packet object data 582 contains the value(s) represented by one or more VDCs and stored in one or more VCEs. Class-specific methods 584 of a packet object 108 provide for communication between the personal computer 20 and devices 21 via the network 28 over different ports or in conjunction with the MediaLink protocol.

By definition, an instance is a specific object with the behaviors defined by its class. An instance inherits all the methods of its class, but has particular data associated with it that is unique. Consequently, each instance 110 through 118 inherits the generic and class-specific methods of its class. For example, a window instance 110 inherits the generic methods 506 and 508, and the class-specific methods 504 of the related window object 100. Thus, a window instance includes generic methods 516 and 518, and class-specific methods 514, plus unique data 512. Likewise, the data and methods of the remaining instances include generic methods, class-specific methods and data. The window, visual reference, VCE, device and packet instances are located in the class database 65 stored in the RAM 68 of the personal computer 20.

The Graphical Control System

As described above, the preferred embodiment of the graphical control system of the present invention includes a personal computer 20, an interface 35 for each non-computer system device 21 having at least one feature control 29a or display 29b, a bus network 28 for connecting the computer 20 to the interface(s) 35, and a VNOS 78 based on the object-oriented programming paradigm just described. Embodiments of this graphical control system can best be understood by describing the presently preferred embodiment of VNOS 78 and the object-oriented programming paradigm in which it exists. Such a description follows.

Returning briefly to FIG. 7, it is the window, visual reference, VCE, device and packet instances that carry out the VNOS 78 functions depicted in blocks 80 through 85 and described above. The flow of messages between these instances within the object-oriented programming paradigm are more fully described next. For purposes of clarity in illustration, the pointers linking each instance have been omitted so that only the flow of messages between instances is shown in the accompanying figures. However, those of ordinary skill in the object-oriented programming art will recognize that the flow of messages follows the paths established by the pointers linking the instances. In addition, those of ordinary skill in this art will appreciate that the flow of messages is bi-directional, meaning messages may flow between instances in either direction. An exception exists for messages sent to and from packet instances since packet instances are either incoming from or outgoing to the bus network 28.

Figure 10:
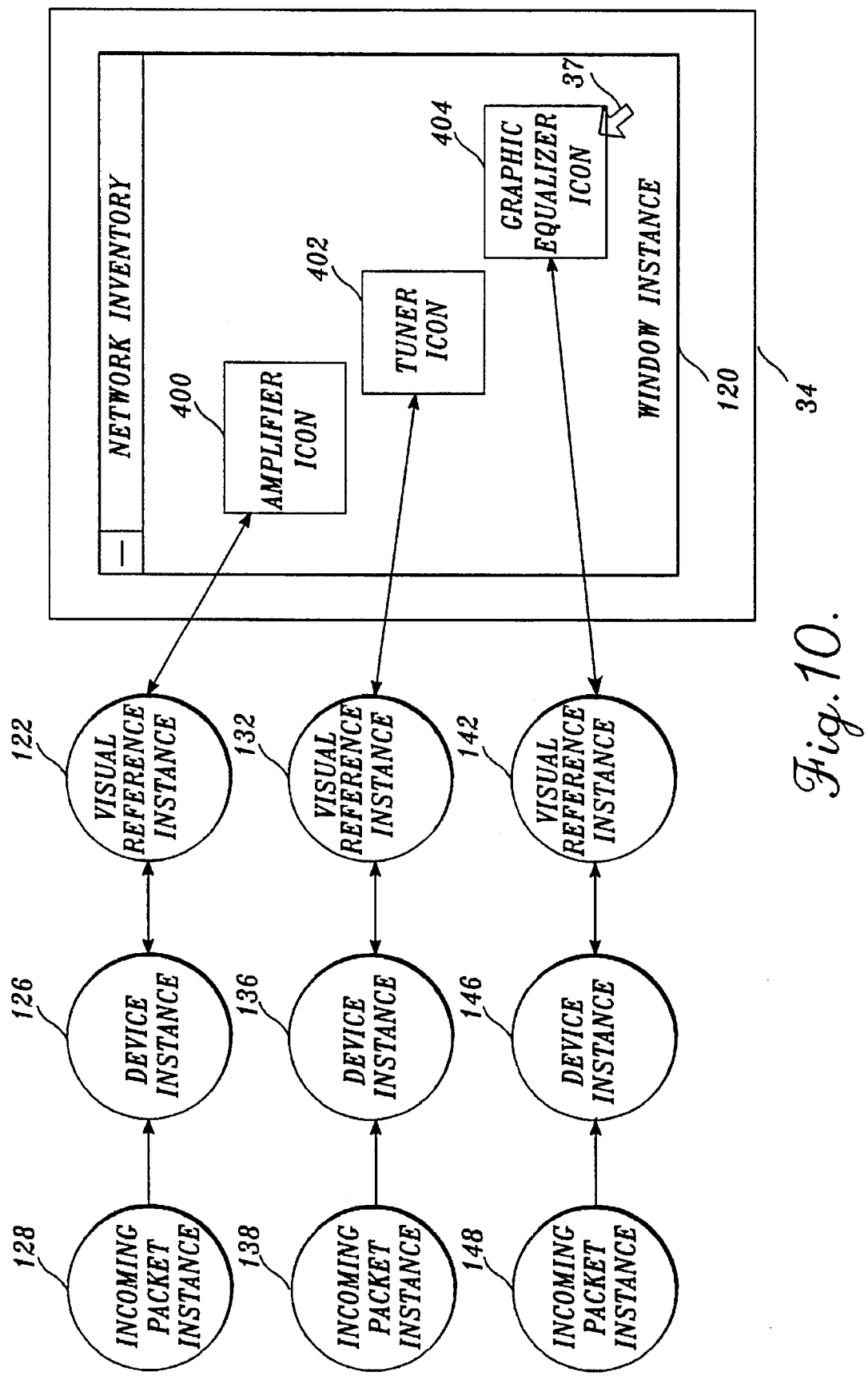
FIG. 10 illustrates the flow of messages between instances of objects when the graphical control system shown in FIG. 1 first encounters a device on the network.

FIG. 10 illustrates one actual embodiment of the present invention, in which the graphical control system notifies the user that a device has appeared on the network. In this particular embodiment VNOS 78a generates window instance 120 on the screen 34 of the personal computer 20. For purposes of illustration and continuity, the window instance 120 shown in FIG. 10 is the Network Inventory window 38 depicted in FIG. 4.

When a device 21, such as amplifier 22, the tuner 24 or the graphic equalizer 26 first appears on the network 40, the device interface 35 sends out a special packet announcing the device over the network 40. The platform services provided by the portion of VNOS 78 stored in the computer 20 continually poll the network for incoming packets from devices. Upon receipt of the special packet, the platform operating services transforms the packet into an incoming packet instance 128, 138 or 148, creates a device instance 126, 136 or 146 representing the new device, and create a visual reference instance 122, 132 or 142. The packet instance 128, 138 or 148 sends a message to device instance 126, 136 or 146 notifying it of the device's presence. Once notified, the device instance 126, 136 or 146 sends a message to a visual reference instance 122, 132 or 142. The visual reference instance 122, 132 or 142 then provides generic methods 526 (FIG. 9B) for generating an icon 400, 402 or 404 representing the device in the window instance 120. The appearance of the icon 400, 402 or 404 on the screen 34 notifies the user that device is connected to the bus network 28.

Assuming that a number of devices 21 are connected to the network, ultimately, window instance 120 will contain a plurality of icons 400, 402 and 404, each representing a device 21. Related VCE instances 112 are unnecessary because icons do not represent feature controls 29a, and hence, do not have a value associated with such a control. In order to select a device to control, the user positions the cursor 37 over the desired icon 400, 402 or 404, and performs a predefined function, such as double clicking a mouse button. For example, if the user selects amplifier 22, represented by icon 400, a window instance 140 of the type shown in FIG. 11 may appear on the screen 34.

Figure 11:
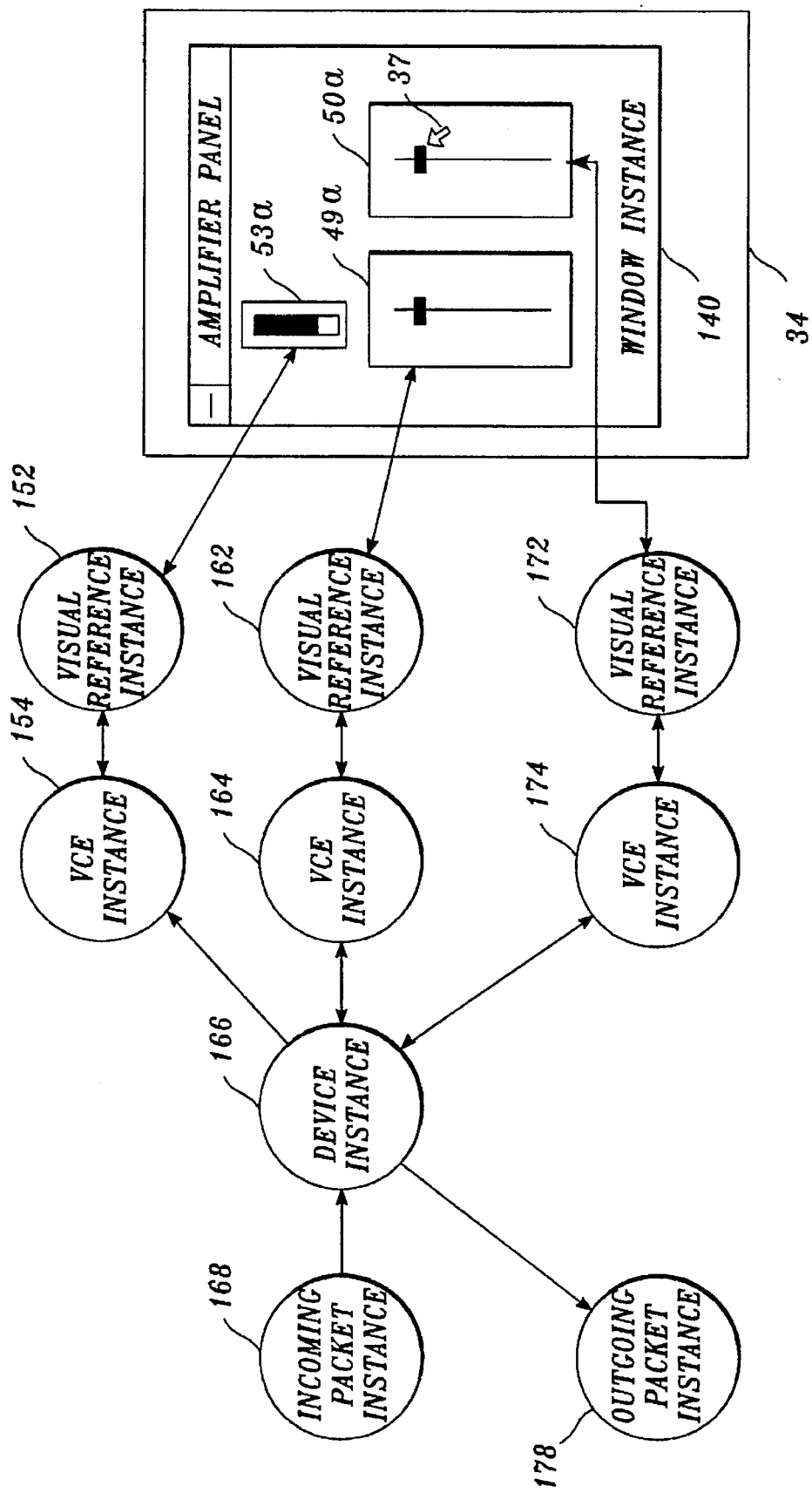
FIG. 11 illustrates the flow of messages between instances of objects when the graphical control system shown in FIG. 1 enables a user to control a device.

FIG. 11 is used to illustrate how the graphical control system of the invention enables a user to control a device via a graphical representation. As described above, VNOS 78 generates a window instance 140 on the screen 34 based upon performing a predetermined function when a cursor is positioned over an icon. The window instance 140 is simplified by showing only a part of the Amplifier Panel window 36 depicted in FIGS. 4 and 6. Specifically, only the Channel 1 input meter VDC 53a and the first and second fader VDCs 49a and 50a are shown. As discussed above in connection with FIG. 6, the user can graphically manipulate any of the VDCs by using the mouse 32 to guide the cursor 37 and perform some predefined function, such as clicking a mouse button, all in a conventional manner.

When the user manipulates the first fader VDC 49a, the user causes a variation in or changes the value represented by the setting of the first fader VDC 49a. As a result, the window instance 140 sends a message to a related visual reference instance 162 notifying it of the change in value. The visual reference instance 162 responds in two ways. First, the generic methods 536 of the visual reference instance 162 regenerate the first fader VDC 49a so that it corresponds graphically to the change in value. To the user, this regeneration appears instantaneously. Second, the visual reference instance 162 sends a message to a VCE instance 164 associated with first fader VDC 49a notifying it of the change in value. The VCE instance 164 stores the change in value caused by the user manipulation and sends a message to a device instance 166 that represents the amplifier 22.

The class-specific methods 544 of the VCE instance 164 associated with the first fader VDC 49a may further manipulate and change the value before sending a message to the device instance 166. For example, the user may desire to increase the volume to 20 decibels. In order to accomplish this, the user uses the mouse 32 to adjust the movable element of the first fader VDC 49a to a 20-decibel level. If the class-specific methods 544 were predefined to set the maximum allowable decibel level at 15 decibels, the adjustment level (20 decibels) could not be achieved. In this example, the class-specific methods 544 would change the value to be stored in the VCE instance 164 from 20 decibels to 15 decibels. The VCE instance 164 would then send a message to both the visual reference instance 162 and the device instance 166 notifying them of this change in value. Consequently, visual reference instance 162 would regenerate the first fader VDC 49a so that its movable element would correspond to 15 decibels.

Once notified of the change in value, the class-specific methods 576 of the device instance 166 prepares an outgoing packet instance 178 containing the new value data 592. The outgoing packet instance 178 is then transformed into a conventional packet by the platform operating services of VNOS 78 and sent over the network 28 to notify the amplifier 22 of the change in value. Upon receipt, the amplifier interface 35 correspondingly adjusts the volume controlled by first fader 49. The role of VNOS 78 at the device interface in adjusting controls, such as the first fader 49, is discussed in more detail below.

When the user graphically manipulates the second fader VDC 50a, virtually the same flow of messages results except that the second fader VDC 50a is associated with its own visual reference instance 172 and VCE instance 174. The second fader VDC 50a sends a message containing the change in value to the second fader visual reference instance 172, which in turn sends a message to the second fader VCE instance 174. The second fader VCE instance 174 sends a message notifying the same device instance 166 of the change in value. Consequently, both the first and second fader VDCs 49a and 50a are linked to the same device instance 166. From the foregoing description, it should be apparent to those familiar with object-oriented programming that any VDC representing a control 29a or display 29b of the amplifier 22 would be linked through a series of visual reference instances and VCE instances to the same device instance 166 so that any change in value caused by user manipulation of a VDC graphically representing a control or display of the amplifier 22 is funneled to the amplifier 22 via the bus network 28. Obviously, the same procedures apply to any other non-computer system device attached to the bus network.

It should be understood that when a control 29a of a device 21 is changed (e.g., by manual operation or monitored electrical change), the flow of messages depicted in FIG. 11 is reversed and that when the VDCs 40 graphically representing those controls on screen 34 are regenerated they are regenerated in a way that shows the change. For example, if the volume of Channel 1 of the amplifier 22 is increased by manually adjusting the first fader 49, VNOS 78 causes the amplifier interface 35 to send a packet containing the change in value to the personal computer 20 via the bus network 28. The platform operating services provided by the part of VNOS 78 located at the personal computer 20 transforms the packet into an incoming packet instance 168. The incoming packet instance 168 sends a message to device instance 166 of the amplifier that notifies the device instance of the change in value made by the manual adjustment of the first fader 49. The generic methods 578 of the device instance 166 then send a message to the VCE instance 164 associated with the first fader VDC 49a. The change in value associated with first fader 49 is then stored in the VCE instance 164. The VCE instance 164 then sends a message to the visual reference instance 162 notifying it of the change in value. The methods of visual reference instance 162 causes the first fader VDC 49 to be regenerated in a manner that corresponds to the change in value effectuated by manually adjusting the first fader 49.

If the second fader 50 of the amplifier 22 is used to change the volume in Channel 2 of the amplifier, virtually the same sequence of events occurs, with one exception. The device instance 166 representing the amplifier 22 sends a message to the VCE instance 174 associated with the second fader VDC 50a. Consequently, visual reference instance 172 regenerates the second fader VDC 50a in a way that corresponds to the change in value effectuated by the manual adjustment of the second fader 50.

It must also be appreciated that as a display 29b of a device 21 fluctuates, the flow of messages depicted in FIG. 11 is reversed and the VDCs 40 graphically representing those displays on the screen 34 are regenerated accordingly. For example, as first input meter 53 fluctuates, VNOS 78 causes the interface 35 of the amplifier 22 to repeatedly send packets to the personal computer 20 via the bus network 28. Each packet contains the change in value associated with the first input meter 53 at a particular instant. The platform operating services provided by the portion of VNOS 78 stored in the computer constantly poll the bus network 28 for incoming packets. Thus, the platform operating services transform received packets in rapid succession. For each packet transformed into an incoming packet instance by the VNOS platform operating services, virtually the same sequence of events as described above occurs except that the flow of messages between instances is relatively constant. More specifically, for each incoming packet instance 168, the device instance 166 of the amplifier 22 sends a message to a VCE instance 154 associated with the first input meter VDC 53a. The VCE instance 154 stores the change in value associated with the first input meter 53 and sends a message to a visual reference instance 152. Consequently, visual reference instance 152 regenerates the first input meter VDC 53a. However, the visual reference instance 152 is constantly receiving a message notifying it of a change in value because the power level being input into the amplifier 22 is constantly fluctuating. Therefore, the visual reference instance 152 is constantly regenerating the first input meter VDC 53a so that the first input meter VDC 53a graphically depicts the changing power level being input into the amplifier 22.

Figure 12:
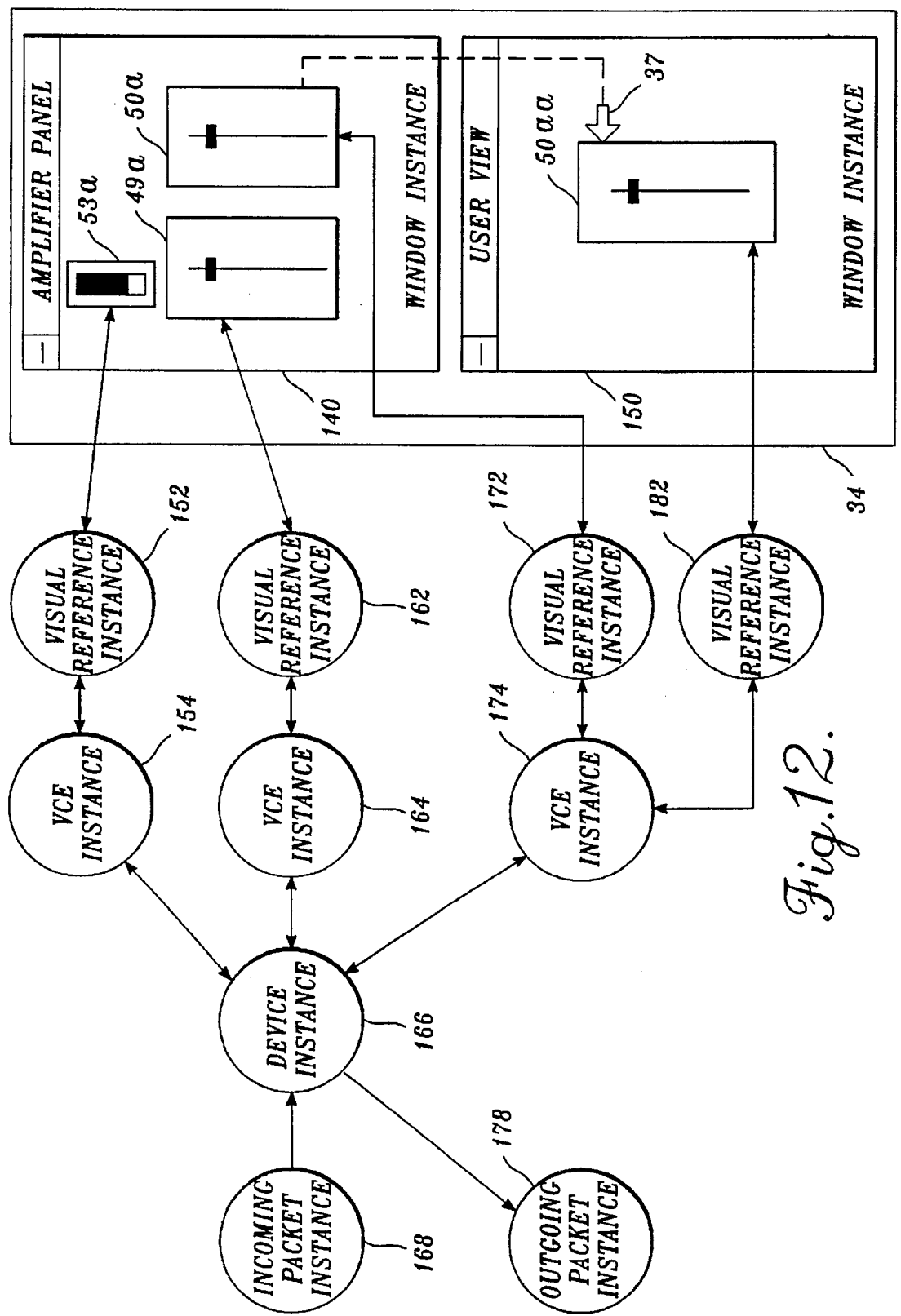
FIG. 12 illustrates the flow of messages between instances of objects when the graphical control system shown in FIG. 1 enables a user to create a cloned visual device control.

FIG. 12 illustrates the flow of messages between object instances when the graphical control system of the present invention enables the user to create a cloned VDC. For purposes of continuity, the same Amplifier Panel window instance 140 that appeared on screen 34 in FIG. 11 now appears on screen 34 in FIG. 12. However, the user has created another window instance 150 entitled "User View." A user makes a cloned VDC by dragging the desired VDC from window instance 140 and dropping the dragged VDC into the User View window instance 150 by manipulating a mouse 32 in a conventional manner. More specifically, a user moves the mouse until the cursor 37 is positioned over the VDC, such as the second fader VDC 50a, to be dragged and dropped. Then, a mouse key is clicked (i.e., depressed). The mouse with the depressed key is then manipulated to move the cursor to a desired location in the User View window instance 150, as shown by the dashed line in FIG. 12. Then, the mouse key is released. The end result is a second fader VDC clone 50aa located in the User View window instance 150. When this occurs, the platform operating services provided by VNOS 78 retrieve a visual reference instance 182 from the class database 65 and link the visual reference 182 to a VCE instance 174 associated with the second fader VDC clone 50aa. Since both the second fader VDC 50a and the second fader VDC clone 50aa are linked to the same VCE instance 174 as opposed to being linked to separate VCE instances, the first fader VDC clone 50aa is an equivalent or clone of the second fader VDC 50a.

Once the second fader VDC clone 50aa has been created in the User View window instance 150, the user may use the second fader VDC clone 50aa to control the amplifier 22 instead of the second fader VDC 50a in the same way as the second fader VDC 50a can be used to control the amplifier. When the user manipulates the second fader VDC clone 50aa, the value visually represented by the second fader VDC 50aa is changed. When this occurs, the User View window instance 150 sends a message to the visual reference instance 182. The class-specific methods 534 of the related visual reference instance 182 instantaneously respond and regenerate the second fader VDC clone 50aa so that it graphically corresponds to the change in value. The class-specific methods 534 also support other graphical alterations made to the second fader VDC clone, such as color changes, size, orientation, operation thresholds, and even the style of the VDC. However, these graphical alterations do not affect the value visually represented by the second fader VDC, nor do they affect the second fader VDC itself, as it appears to the user.

As the visual reference instance 182 regenerates the second fader VDC clone 50aa, the visual reference instance 182 also sends a message to the VCE instance 174 associated with both the second fader VDC 50a and the second fader VDC clone 50aa. The VCE instance 174 stores the change value. Since the VCE instance 174 is also associated with the second fader VDC 50a, the VCE instance 174 sends a message to visual reference instance 172 associated with the second fader VDC, which regenerates the second fader VDC 50a in a manner that reflects the change in value. To the user it appears that both the second fader VDC clone 50aa and the second fader VDC 50a are simultaneously regenerated on the computer screen 34.

In addition to sending a message to the visual reference 172, the VCE instance 174 sends a message to the device instance 166 associated with the amplifier 22 notifying it of the change in value effected by the user manipulation of the second fader VDC clone 50aa. The general methods 576 of the device instance 166 then prepare an outgoing packet instance 178 containing data 592 comprising the change in value. The outgoing packet instance 178 is then transformed into a conventional packet by the platform operating services provided by VNOS 78 and sent to the amplifier 22 over the network 28. When received by the amplifier 22, the amplifier interface 35 adjusts the volume controlled by the second fader 50 to correspond to the change in value. Hence, just as the behavior of second fader 50 can be controlled by the first fader VDC 50a, the behavior of second fader 50 can be controlled by the second fader VDC clone 50aa.

In view of the preceding discussion, it will be apparent to those of ordinary skill in this art that any VDC 40 in any window instance can be cloned in another window instance. Thus, a user could create three cloned VDCs in the User View window instance 150 shown in FIG. 12 in the manner described above, one for each of the non-computer system devices (the amplifier 22, the tuner 24 and the equalizer 26) connected to the network. Or only some of the VDCs can be cloned into the User View window. In this way a user can create his or her own unique graphical control display comprising VDCs associated with numerous devices.

It must be appreciated that if first fader 49 or the second fader 50 of the amplifier 22 are manually or electrically operated, or operated by another computer, the flow of messages illustrated in FIG. 12 is reversed. More specifically, if first fader 49 of the amplifier 22 is manually operated, VNOS 78 causes the amplifier interface 35 to send a packet to the computer 20 via the bus network 28. When the packet is received, the packet is transformed by the platform operating services provided by VNOS 78 into an incoming packet instance 168. The incoming packet instance 168 sends a message to the device instance 166 notifying it that a change has occurred in the value associated with the first fader 49. Consequently, device instance 166 sends a message to the first fader VCE instance 164. The first fader VCE instance 164 stores the change in value and sends a message to the first fader visual reference instance 162. The first fader visual reference instance 162 then regenerates the first fader VDC 49a such that it visually corresponds to the change in value effectuated by the manual operation of the first fader 49.

If the setting of the second fader 50 is changed manually or electronically, the same sequence of events occurs except that the device instance 166 representing the amplifier 22 sends a message to the VCE instance 174 associated with both the second fader VDC 50a and the second fader VDC clone 50aa. The VCE instance 174 sends a message to both the second fader VDC visual reference instance 172 and to the second fader VDC clone visual reference instance 182 notifying them of the change in value. The second fader VDC visual reference instance 172 causes the second fader VDC 50a to be regenerated in the Amplifier Panel window instance 140, while the second fader VDC clone visual reference instance 182 causes the second fader VDC clone 50aa to be regenerated VDC 304 in the User View window instance 150. To the user it appears that the second fader VDC and the second fader VDC clone are simultaneously being regenerated in a way that corresponds to the change in value effectuated by the manual or electrical change made to the second fader 50 of the amplifier.

Figure 13:
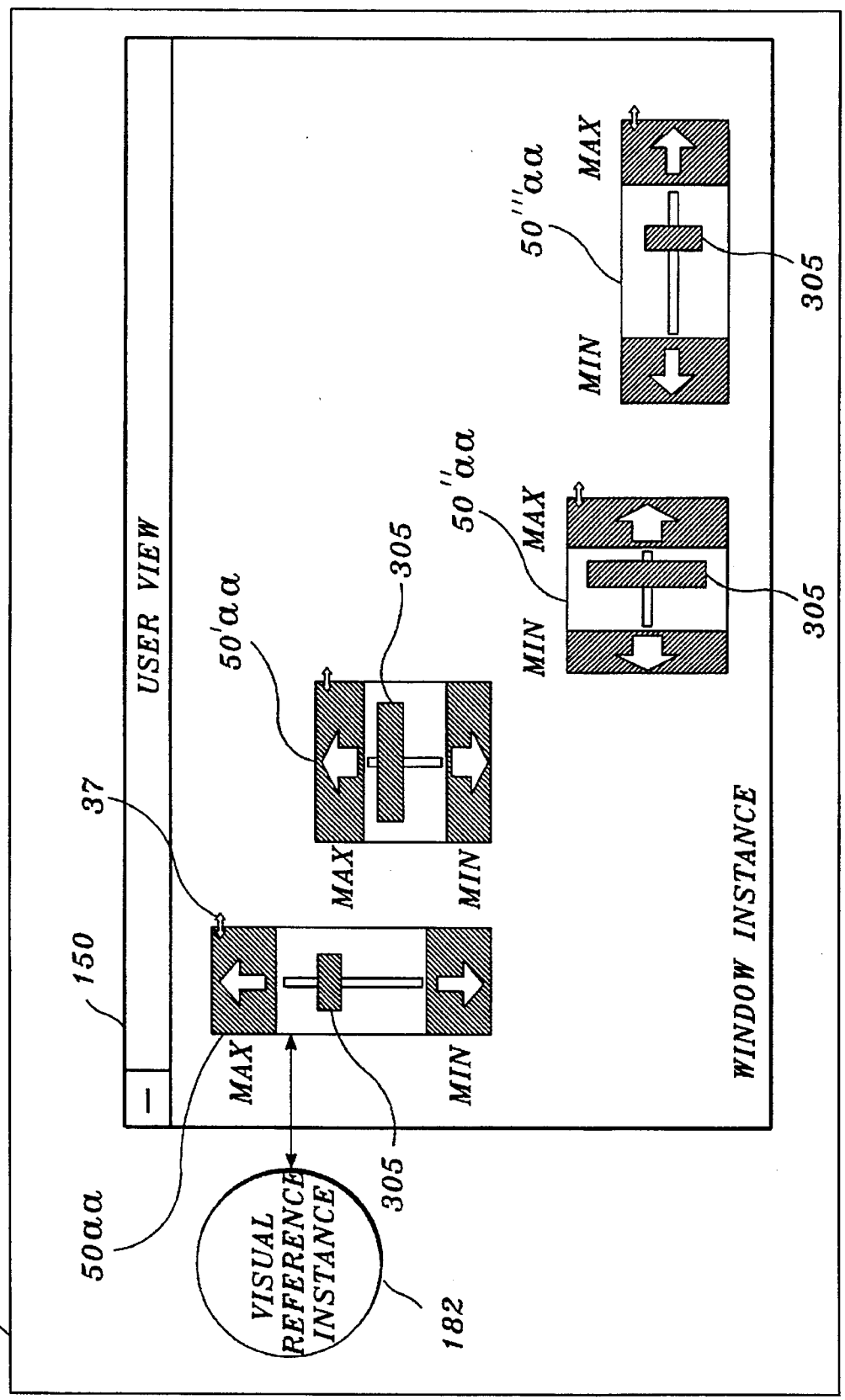
FIG. 13 illustrates the flow of messages between instances of objects when the graphical control system shown in FIG. 1 automatically regenerates operable dimensions of a visual device control.

As illustrated in FIG. 13, both the length and width dimensions and the orientation of a VDC may be changed by VNOS 78 independent of a change in value displayed by the VDC. For purposes of continuity, the same User View window instance 150 shown in FIG. 12 is shown in FIG. 13. Thus, FIG. 13 includes a User View window instance 150 that includes the second fader VDC clone 50aa of the amplifier 22. While for purposes of clarity in illustration, the accompanying VCE, device and packet instances have been omitted from FIG. 13, it will be appreciated that second fader VDC clone 50aa remains associated with those instances from FIG. 13, which are depicted in FIG. 12, through the associated visual reference instance 182. As will be better understood from the following description, it is immaterial for purposes of this aspect of the invention whether the depicted VDC clone 50 is an original or a cloned VDC.

As discussed above, the second fader VDC clone 50*aa* shown in FIG. 13 is a graphical representation of second fader 50 of the amplifier 22. The second fader VDC clone 50*a* appears as a rectangle having a height greater than its width that is operated vertically by moving a graphical knob 305 upwardly toward a maximum (MAX) value or downwardly toward a minimum (MIN) value. As described above, the knob is "moved" by appropriately manipulating a mouse or other cursor control device. Movement of the graphical knob changes the value represented by the second fader VDC clone 50*aa* and, in turn, causes the second fader VDC clone 50*aa* to be regenerated with the change in value depicted.

In addition to including the second fader VDC clone 50*aa*, FIG. 13 also includes three other second fader VDC clones 50'*aa*, 50"*aa*, and 50'"*aa* having different height and width dimensions but otherwise having the same graphics as the second fader VDC clone 50*aa*. The height of the first other second fader VDC clone 50'*aa* is less and the width greater than the original second fader VDC clone 50*aa*. The height of the second other second fader VDC clone 50"*aa* is less and the width greater than the first other second fader VDC clone 50'*aa*. The height of the third other second fader VDC clone 50'"*aa* is less and the width greater than the second other second fader VDC clone 50"*aa*. Further, the orientation of the second fader clones is different. The knob 305 of the original and first other second fader VDC clones 50*aa* and 50'*aa* are positioned for vertical movement, whereas the knob 305 of the second and third other second fader DC clones are positioned for horizontal movement. How VNOS changes a VDC is the manner shown in FIG. 13 is described next.

Generic methods 566 of the visual reference instance 182 associated with the second fader VDC clone 50*aa* allow a user to use a mouse 32 or other cursor control device to simultaneously decrease the height of a VDC while increasing the width of the VDC. This is accomplished, for example, by using the mouse to place the cursor 37 over one vertical edge of the second fader VDC clone 50*aa*, depressing a button located on the mouse to "click" on the edge and dragging the edge outwardly by moving the mouse in the appropriate direction. As the width of the VDC increases, the height automatically decreases. Continuing this action transforms the VDC from a VDC having a height greater than its width to a VDC having a width greater than its height. When the width becomes greater than the height, the related window instance 150 sends a message to the visual reference instance 182 associated with the second fader VDC clone. Upon receipt of this message, the class-specific methods 524 of the visual reference instance 182 cause the second fader VDC clone to be automatically regenerated in a form designed for horizontal as opposed to vertical operation. In other words, the orientation of the second fader VDC clone is rotated by 90°. Thus, while the second and third other second fader VDC clones 50"*aa* and 50'"*aa* an still graphically represent the second fader 50 of the amplifier 22, they are operated by the graphical knob 305 of the VDC horizontally rather than vertically. The automatic reorientation of the second fader VDC clone does not result in a change in value nor does it result in a change of the MAX and MIN values. Consequently, no messages are sent to the other VCE, device and packet instances (FIG. 12). As will be appreciated from the foregoing description, the second fader VDC clone may be returned to its original form having its original orientation and dimensions by reversing the foregoing procedure, if desired. It will also be appreciated that any other VDC 40 may be automatically resized and, if desired, reoriented in a similar manner.

Figure 14:
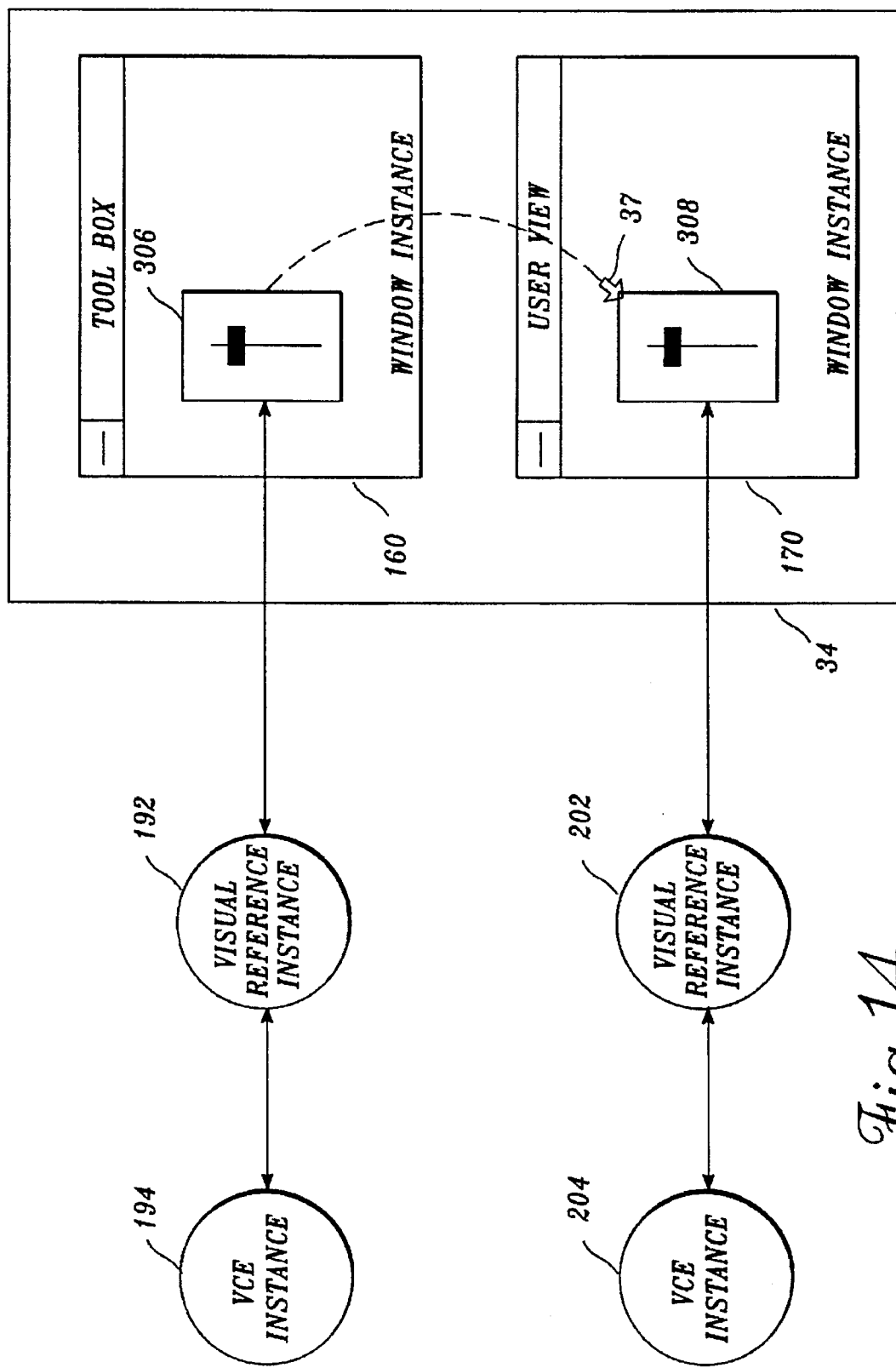
FIGS. 14, 15 and 16 illustrate the flow of messages between instances of objects when the graphical control system shown in FIG. 1 enables a user to control a plurality of devices with a single visual device control.
Figure 15:
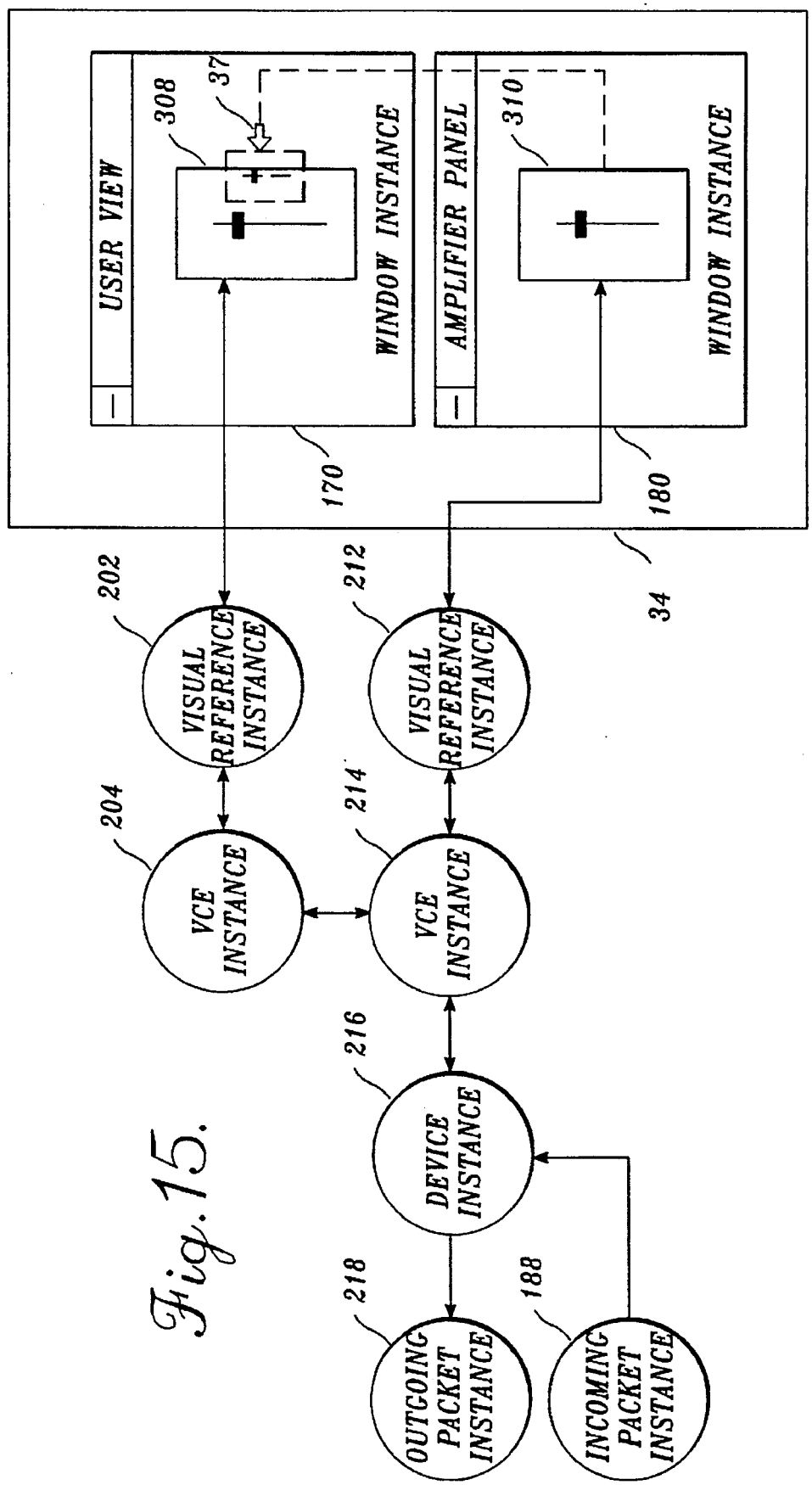
Figure 16:
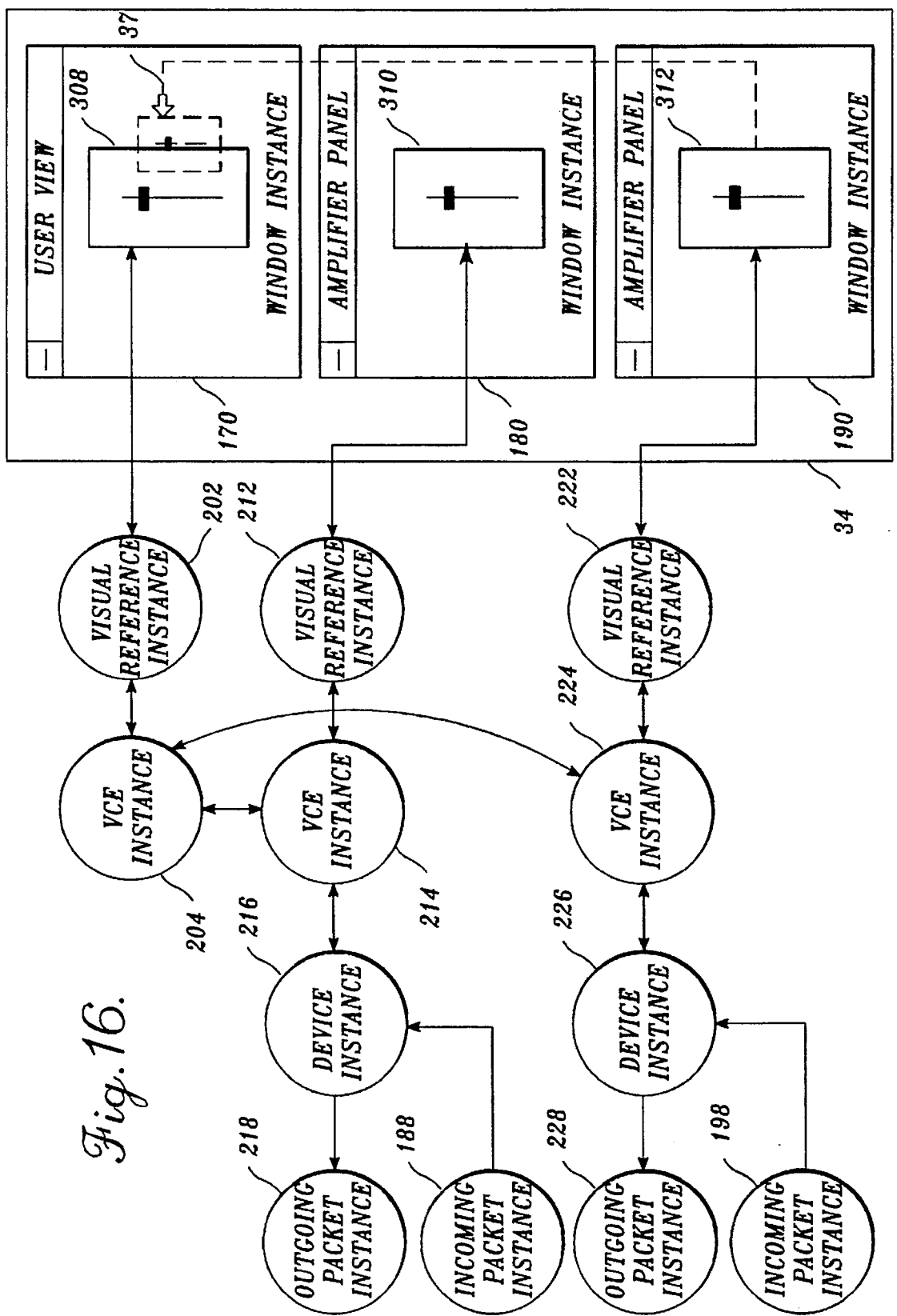

FIGS. 14, 15 and 16 illustrate how a master VDC is created and used to control a plurality of noncomputer system devices 21. First, VNOS 78 is enabled to generate a window instance 160 entitled "Toolbox" which contains one or more "template" VDCs 306. A VDC is considered a "template" because it is not actually associated with any particular device 21. A template VDC graphically replicates a feature control or display of a hypothetical device. Because no device exists, only the template VDC 306 and an associated visual reference instance 192 are needed. A template VCE instance 194 contains a null value. A master VDC is created by a user first cloning the desired template VDC 306 in a User View window instance 170, using a mouse or other cursor control device to manipulate the cursor 37 in the manner previously described. When this occurs, the related visual reference instance 192 and template VCE instance 194 are replicated as well. Thus, new visual reference and VCE instances are created. For purposes of this description the cloned template VDC and the new visual reference and VCE instances are hereinafter referred to as the master VDC 308, the master visual reference instance 202, and the master VCE instance 204, respectively. Although not shown in FIG. 14, Tool Box window instance 160 may contain a number of "template" VDCs, each of which can be cloned in one or more User View window instances in the manner described above. It will also be appreciated that a template VDC may be "dropped" upon another VDC 40 using the mouse and that the VDC 40 will regenerate itself accordingly.

Referring now to FIG. 15, two window instances are shown on screen 34 of the personal computer 20, the User View window instance 170 shown in FIG. 14 and an Amplifier Panel window instance 180. As described above, the User View window instance 170 contains the master VDC 308. FIG. 15 also includes the master reference instance 202 and the mater VCE instance 204. The Amplifier Panel window instance 180 contains a VDC 310 that graphically represents a control 29*a*, such as a fader, of an amplifier. The user, using a mouse or other cursor control device to manipulate the cursor 37 drags the amplifier control VDC 310 from the Amplifier Panel window instance 180 into the User View window instance 170 in the manner previously described. The amplifier control VDC 310 is moved until it is positioned atop the master VDC where it is trapped by the user releasing a depressed key of the mouse or other cursor control device. When the amplifier control VDC 310 is dropped, an object-to-object interaction (as shown by the dotted line and phantom VDC) occurs. The object-to-object interaction establishes a master-slave relationship between the amplifier control VDC 310 and the master VDC 308.

The object-to-object interaction causes the User View window instance 170 to send a message to the master visual reference instance 202, which in turn sends a message to the master VCE instance 204. The class-specific methods 554 of the master VCE instance 204 establish a link to a VCE instance 214 associated with the amplifier control VDC 310 by generating a pointer that points from the master VCE instance 204 to the amplifier control VCE instance 214, and a pointer from the amplifier control VCE instance 214 to the master VCE instance 204 (as noted earlier, pointers have been omitted in FIG. 15, for purposes of clarity in illustration).

After the foregoing link is established, the class-specific methods 554 of the master VCE instance 204 have the ability to send control messages to the amplifier control VCE instance 214 and thereby control the behavior of amplifier control VCE instance 214. In this way the master VCE instance 204 becomes a master of the amplifier control VCE instance, which, in turn, becomes a "slave" VCE instance. Finally, the pointer to the amplifier control (slave) VCE instance 214 is added to a list of slave pointers included in the data 552 of the master VCE instance 204; and the pointer to the master VCE instance 204 is added to a list of master pointers included in the data of the amplifier control (slave) VCE instance 214.

A further consequence of the master-slave relationship between the master VCE instance 204 and the amplifier control (slave) VCE instance 214 is that master VDC 308 controls the amplifier control, VDC 310 which, in turn, becomes a "slave" VDC. In other words, since the master VDC 308 is associated with the master VCE instance 204, and the master VCE instance 204 governs the behavior of the amplifier control (slave) VCE instance 214, the master VDC 308 governs the amplifier control (slave) VDC 310.

Once the master-slave relationship described above is established, the user may use the master VDC 308 located in the User View window instance 170 to control the feature (i.e., the amplifier control) depicted by the amplifier control (slave) VDC 310 in window instance 180. More specifically, when the user manipulates the master VDC 308, User View window instance 170 sends a message to the master visual reference instance 202. The master visual reference instance 202 simultaneously regenerates the master VDC 308 to correspond to the change in value and sends a message to the master VCE instance 204. The master VCE instance 204 stores the change in value and sends a control message to the amplifier control (slave) VCE instance 214. Prior to the message being sent, the class-specific methods 544 of the master VCE instance 204 may further manipulate the value.

The amplifier control VCE instance 214 stores the change in value contained in the message received from the master VCE instance 204 and sends messages to the device instance 216 and the visual reference instance 212 notifying both of the change in value. The device instance 216 sends a message to outgoing the packet instance 218. The outgoing packet instance 218 transforms this message into a conventional packet and sends the packet to the device being controlled (i.e., the amplifier) via the bus network 28. Upon receipt, device interface 35 adjusts the control of the device 24 to correspond to the change in value effectuated by the master VDC 310.

As for the appearance of the amplifier control (slave) VDC 310, the amplifier control visual reference instance 212 causes the amplifier control (slave) VDC 310 to be regenerated in a way that shows the change in value effectuated by the master VDC 308. Hence, the amplifier control (slave) VDC 310 graphically corresponds to the master VDC 308.

As shown in FIG. 16, the master VDC 308 can also be used to control a plurality of slave VDCs, as long as the slave VDCs are of the same type (e.g., the slave VDCs must graphically represent the same type of control or display). The master VDC 308 can simultaneously control a plurality of the same type of controls from the same device or a plurality of the same type of controls from different devices.

FIG. 16 includes all of the elements of FIG. 15 plus a second Amplifier Panel window instance 190. The second Amplifier Panel window instance 190 contains an amplifier control VDC 312 that graphically replicates the master VDC 308 and the first amplifier control VDC 310. Although the amplifier control VDC 312 is shown as a replica of the master VDC 308 in FIG. 16 for ease of description, graphical replication of VDCs is not required. Rather, only functional identity is required. For example, a rotary control knob is functionally identical to a linear sliding knob, but graphically different.

Again, using a mouse or other suitable cursor control device (e.g., a track ball) a user drags the second amplifier control VDC 312 from the second Amplifier Panel window instance 190 into the User View window instance 170 and drops it on the master VDC 308, creating another object-to-object interaction (as shown by the dotted line and phantom VDC in FIG. 16). This object-to-object interaction results in the creation of another master-slave relationship between the second amplifier control VDC 312 and the master VDC 308. As a result, the VCE instance 224 associated with second amplifier control VDC 312 becomes a "slave" VCE instance 224 to the master VCE instance 204; and the second amplifier control VDC 312 becomes a "slave" to the master VDC 308. Consequently, the graphical manipulation of the master VDC 308 will result in an adjustment of the amplifier control of two devices (the first and second amplifiers). Manipulation of the master VDC 308 will also cause the first and second amplifier control (slave) VDCs 310 and 310 to be regenerated in a way that shows the change made by manipulating the master VDC. It will be appreciated that numerous slave VDCs may be created in the same manner and manipulated by the master VDC.

It should be understood that when the related control of any device under the control of a master VDC is manually operated or operated electronically from another source, the flow of messages depicted in FIG. 16 is reversed. For example, if the amplifier control of the first amplifier is manually adjusted, VNOS 78 causes interface 35 of the first amplifier to send a packet containing the resultant change in value to the personal computer 20 via the bus network 28. Upon receipt, the packet is transformed into an incoming packet instance 218, causing messages to be sent to the device instance 216, the first amplifier control VCE instance 214 and the first amplifier control visual reference instance 212. The visual reference instance 212 regenerates the amplifier control VDC 310 so that it graphically shows the change in value effectuated by the manual operation of the first amplifier control of the first amplifier. In a preferred embodiment, a message is also sent to the master VCE instance 204, which causes the master visual reference instance to regenerate the master VDC 308 so that it graphically shows the change in value effectuated by the manual operation of the amplifier control 29a of the first amplifier. The master VCE instance 204 also sends a message to the second amplifier control VCE instance. Receipt of this message causes the second amplifier control VDC 312 to be regenerated to show the change in value. Receipt of this message also causes the adjustment of the amplifier control of the second amplifier.

Now that the VNOS 78 functions depicted in blocks 80, 81 and 82 of FIG. 7 have been thoroughly described, the VNOS 78 functions carded out by the portion of VNOS 78 stored at the non-computer system devices must be considered. In order to carry out the functions depicted in blocks 83, 84 and 85, VNOS 78 employs an object-oriented programming paradigm shown from a class hierarchy perspective in FIG. 17A. The object-oriented programming paradigm employed by the portion of VNOS 78 stored in the device interfaces 35 primarily employs two different objects. These objects are packet and device control element (DCE) objects 107 and 109 and are shown as class objects in FIG. 17A. Briefly, interface packet objects 107 are quite similar to the packet object 108 employed by the personal computer 20. Thus, interface packet objects contain the methods and data for communicating data between devices 21 and the personal computer 20 via the bus network 28. DCEs objects 109 contain the value represented by a feature control 29a or display 29b of a device 21 and the methods for manipulating that value.

Figure 17B:
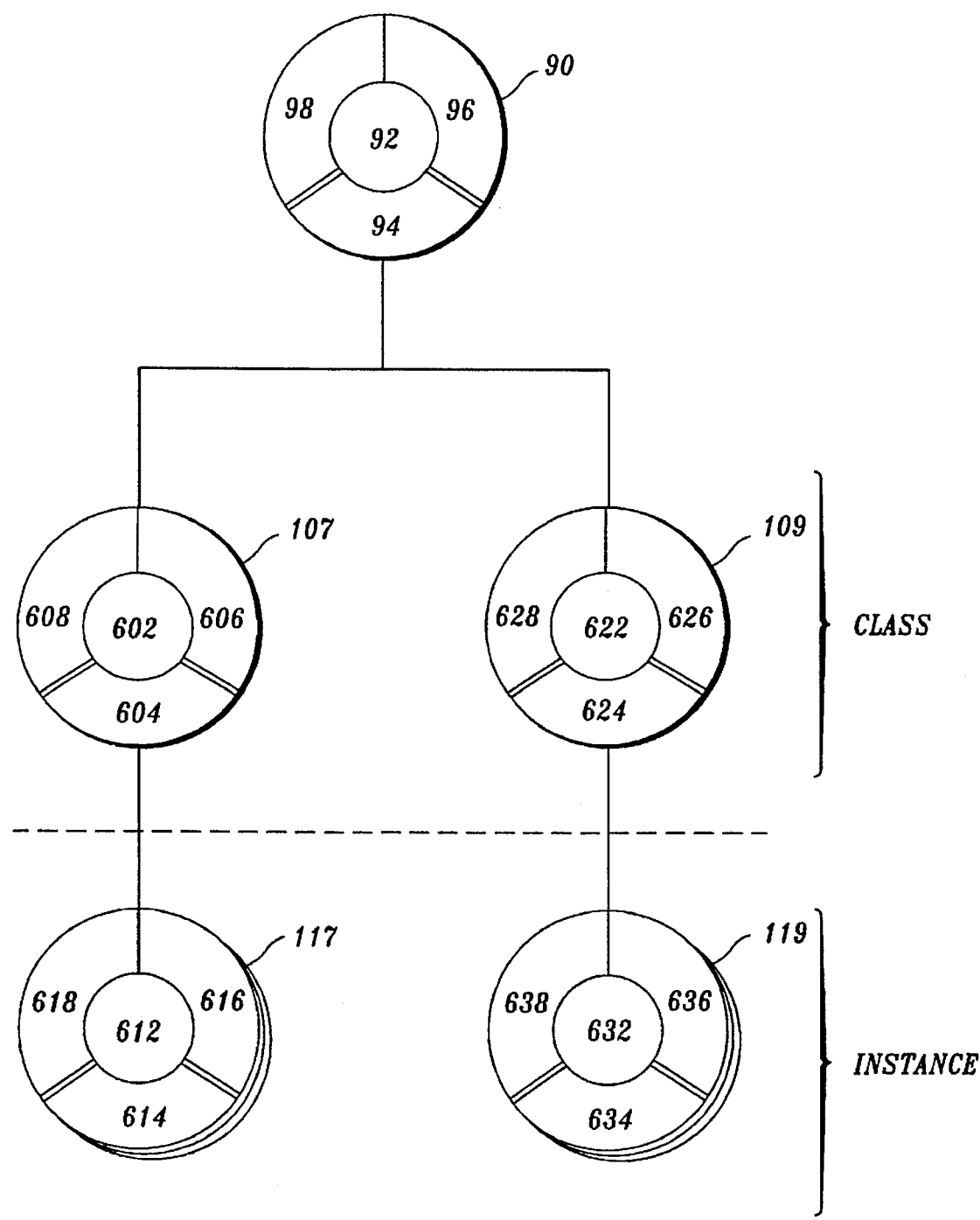
FIG. 17B illustrates the methods and data provided by the object-oriented programming paradigm depicted in FIG. 17A.

FIG. 17A also illustrates the relationship between classes and instances in the object-oriented programming paradigm used by the present invention. As previously described, each class object can generate one or more instances. Thus, an interface packet object 107 can generate several interface packet instances 117. Likewise, a DCE object 109 can generate several DCE instances 119. A packet sent or received by a device interface 35 is an example of an interface packet instance 117. A DCE instance 119, on the other hand, is generated when a feature control 29a or display 29b on a device 21 as shown in FIG. 1 is effectuated either mechanically, electrically or by manipulation of its corresponding VDC 40. A DCE instance will exist for each feature control 29a or display 29b of a device 21. Each of the interface packet and DCE instances are part of the class database stored in RAM 59 of the device interface 35.

A more detailed description of each of the two objects employed by the portion of VNOS 78 located in the device interface 35 is next set forth. As illustrated in FIG. 8, every object 90 contains data 92, generic methods 96 and 98, and class-specific methods 94. FIG. 17A illustrates the methods and data contained by the packet and DCE objects and instances depicted in FIG. 17A.

Now referring to FIG. 17A, interface packet objects 107 contain the methods and data for communicating between a device 21 and the computer 20 via the bus network 28. Interface packet object data 602 include device information to be transmitted over the network in a data packet. Hence, interface packet object data include the value represented by the control or display. In addition, interface packet object data 602 (if any) includes a list of pointers to DCE objects 109 and other interface packet objects 107 (if any). The class-specific methods 604 of an interface packet object 107 provide for communication between the personal computer 20 and the device 21 related to the interface packet object via the network 28 over different ports or in conjunction with the MediaLink protocol. The generic methods 606 and 608 of an interface packet object provide for communication between the interface packet object 107 and the related DCE object 109.

DCE objects 109 serve to interpret, store and perhaps further manipulate the value represented by the control 29a or display 29b of a device 21. DCE object data 622 comprises the value represented by a control or display. Consequently, when a feature control or display is effectuated, DCE object data 622 changes accordingly. The data value may undergo further manipulation as provided by the DCE object class-specific methods 624. For example, a DCE object class-specific method 624 may further change a value by executing a scaling function on the value or converting a numerical value to a textual value. Code is loaded into the class-specific methods of DCE object 109 by the platform operating services provided by the portion of VNOS 78 located in the device interface 35.

As noted above, by definition, an instance is a specific object with the behaviors defined by its class. An instance contains all the methods of its class, plus unique additional data. Consequently, both interface packet instances 117 and DCE instances 119 include all of the generic and class-specific methods of their class objects. For ease of association, the data of interface packet instance 117 is labeled data 612, and the generic and class-specific methods 614 are labeled 616, 618 respectively. The data of DCE instance 119 is labeled data 632, and the generic and class specific methods are labeled 636, 638 and 634 respectively. Each interface packet and DCE instance is stored in the class database located in RAM 59 of the interface 35 of the related device 21.

Figure 18:
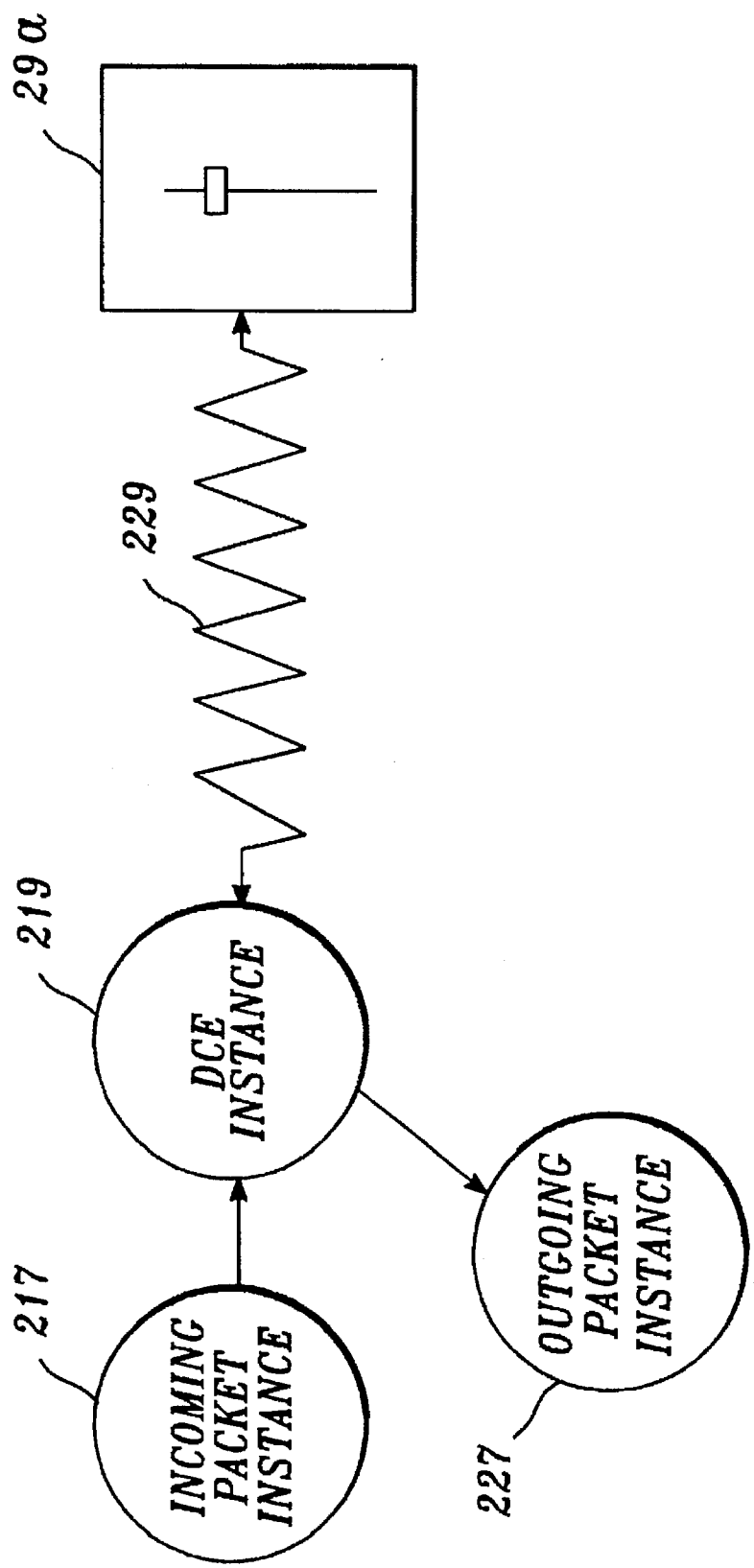
FIG. 18 illustrates the flow of messages between instances of objects when the graphical control system shown in FIG. 1 effectuates a device control.

FIG. 18 illustrates the flow of messages between device instances when the graphical control system of the present information effectuates a change in a device 21. When the user manipulates a VDC 40 graphically representing a control 29a of a device 21, as discussed above, the personal computer 20 sends a packet containing the resultant change in value to the appropriate device 21 via the bus network 28. As shown in FIG. 15, when the packet is received by a device interface 35, it is transformed into an incoming interface packet instance 217 by the platform operating services provided by the portion of VNOS 78 stored in the interface. The pack instance data 612 includes the change in value effectuated by manipulation of the VDC 40. The incoming interface packet instance 217 sends a message to the related DCE instance 219. The change in value is then stored in the DCE instance 219. The processor 41 of device interface 35 (shown in FIG. 2) then generates an electronic signal 229 which is sent to the control 29a of the device 21. The signal 229 is used to adjust the control 29a to correspond to the change in value effectuated by the VDC 40.

When a control 29a of a device 21 is effectuated locally (e.g., by manual operation) or electronically by another controller or internal command, the processor 41 of the device interface 35 receives a signal 229 from the control 29a. The platform operating services provided by the portion of VNOS 78 located in the interface causes the processor 41 to transform the signal into a DCE instance 219 and create an outgoing interface packet instance 227. The data 632 of the DCE instance 219 comprises the change in value resulting from effectuating the control 29a. The DCE instance 219 sends a message to the outgoing interface packet instance 227 notifying it of the change in value. The platform operating services of VNOS 78 then cause the processor 41 of device interface 35 to transform the outgoing packet instance 227 into an outgoing packet. The device interface 35 then sends the packet to the personal computer 20 via the bus network 28. It will be appreciated that in the case of a display 29b rather than a control, where an aspect of a device is being monitored, the device interface 35 constantly sends packets to the personal computer 20. What occurs when the packet is received by the personal computer 20 is described above.

While a preferred embodiments of the invention have been illustrated and described, it will be appreciated that various changes can be made therein without departing from the spirit and scope of the invention. Accordingly, it is not intended that the scope of the invention be limited by the disclosure of the preferred embodiments described above. Instead, the invention should be determined entirely by reference to the claims that follow.

The embodiments of the invention in which an exclusive property or privilege is claimed are defined as follows:

1. A graphical control system for controlling at least one non-computer system device, the graphical control system comprising:

(a) a communication medium;

(b) a computer coupled to the communication medium, the computer including a display, a processor, a storage medium and a user manipulation device;

(c) an interface for coupling the non-computer system device to the communication medium, the interface including an interface processor and an interface storage medium; and (d) a visual network operating system for controlling and monitoring operation of the computer and the interface by:

(i) causing the computer to display an adjustable visual device control, the visual device control graphically representing a feature control of a type normally associated with the non-computer system device, the visual device control having associated data stored in the computer storage medium that represents the adjustment of the visual device control;

(ii) enabling a user to adjust the visual device control by operating the user manipulation device upon the visual device control and effectuating a change in the data that represents the adjustment of the visual device control;

(iii) communicating the change in the data that represents the adjustment of the visual device control to the interface;

(iv) causing the interface to adjust the non-computer system device in accordance with the change in the data that represents the adjustment of the visual device control;

(v) detecting an adjustment to the feature control associated with the non-computer system device, the feature control having associated data stored in the interface storage medium that represents the adjustment to the feature control;

(vi) effectuating a change in the data that represents the adjustment of the feature control;

(vii) communicating the change in the data representing the adjustment of the feature control to the computer; and (viii) causing the computer to regenerate any visual device control representing the feature control in accordance with the change in the data that represents the adjustment of the feature control.

2. The graphical control system of claim 1, wherein the visual network operating system enables the user to predefine a function for further manipulating the change in data that represents the adjustment of the visual device control.

3. The graphical control system of claim 2, wherein the visual network operating system enables the user to create a clone of the visual device control which also graphically represents the feature control, wherein the clone has the same associated data stored in the computer storage medium as the visual device control.

4. The graphical control system of claim 3, wherein the visual network operating system enables the user to effectuate a change in the data that represents the adjustment of the visual device control by operating the user manipulation device upon the clone.

5. The graphical control system of claim 3, wherein the visual network operating system enables the user to graphically alter the clone without effectuating a change in the data that represents the adjustment of the visual device control and without graphically altering the visual device control.

6. The graphical control system of claim 3, wherein the visual network operating system enables the user to create a plurality of clones of the visual device control so that each clone graphically represents the feature control, each clone having the same associated data as the visual device control.

7. The graphical control system of claim 1, wherein the visual device control has an adjustable visual device control element, wherein the adjustable visual device control element moves linearly, and wherein the adjustable visual device control element moves vertically when a height of the visual device control is greater than a width of the visual device control.

8. The graphical control system of claim 7, wherein the visual device control element of the visual device control moves horizontally when the width of the visual device control is greater than the height of the visual device control.

9. The graphical control system of claim 8, wherein the visual network operating system:

(a) enables the user to increase the width of the visual device control, while decreasing the height of the visual device control by operating the user manipulation device; and (b) causes the computer to automatically regenerate the visual device control so that the adjustable visual device control element of the visual device control moves horizontally when the width of the visual device control becomes greater than the height.

10. The graphical control system of claim 9, wherein the visual network operating system:

(a) enables the user to increase the height of the visual device control, while decreasing the width of the visual device control by operating the user manipulation device; and (b) causes the computer to automatically regenerate the visual device control so that the adjustable visual device control element of the visual device control moves vertically when the height of the visual device control becomes greater than the width.

11. The graphical control system of claim 1, wherein the visual network operating system causes the computer to display a template visual device control, the template visual device control graphically representing a hypothetical feature control of the type normally associated with a hypothetical non-computer system device.

12. The graphical control system of claim 11, wherein the visual network operating system enables the user to create an adjustable master visual device control from the template visual device control by operating the user manipulation device, the master visual device control graphically representing the hypothetical feature control, the master visual device control having associated data stored in said computer storage medium that represents the adjustment of the master visual device control.

13. The graphical control system of claim 12, wherein the visual network operating system enables the user to govern the visual device control using the master visual device control by:

(a) enabling the user to graphically create an interaction between the visual device control and the master visual device control by operating the user manipulation device;

(b) as a result of the interaction, establishing a relationship between the master visual device control and the visual device control so that:

(i) operating the user manipulation device upon the master visual device control effectuates a change in the data representing the adjustment of the master visual device control; and (ii) the change in the data representing the adjustment of the master visual device control effectuates a similar change in the data representing the adjustment of the visual device control.

14. The graphical control system of claim 13, wherein the visual network operating system enables the user to govern a plurality of visual device controls using the master visual device control.

15. The graphical control system of claim 12, wherein the visual network operating system enables the user to predefine a function for further manipulating the change in data representing the adjustment of the master visual device control so that the manipulated change in the data representing the adjustment of the master visual device control effectuates a similar manipulated change in the data representing the adjustment of the visual device control.

16. The graphical control system of claim 1, wherein the visual network operating system employs an object-oriented programming paradigm in which a plurality of objects are used to control the computer, and wherein the objects are interoperable and organized into classes in a hierarchical fashion.

17. The graphical control system of claim 16, wherein five types of objects are employed by the visual network operating system for controlling the computer, the five types of objects comprising:

(a) a window object containing the data and methods necessary to display a window on the display of the computer;

(b) a visual reference object containing the data and methods necessary for displaying the visual device control in the window;

(c) a value control element object containing the data representing the adjustment of the visual device control, and methods necessary for interpreting and storing the data representing the adjustment of the visual device control;

(d) a device object containing the data and methods necessary for communicating with the non-computer system device and for managing a graphical representation of the non-computer system device on the display of the computer; and (e) a packet object containing the data and methods necessary for communicating the change in data that represents the adjustment of the visual device control to the interface.

18. The graphical control system of claim 17, wherein each type of object may be divided into lower order subclasses of objects.

19. The graphical control system of claim 17, wherein the visual reference object further contains the data and methods necessary for displaying an icon representing the non-computer system device in a window on the display of the computer.

20. The graphical control system of claim 17, wherein the methods of each of the five types of objects further comprise generic methods and class-specific methods.

21. The graphical control system of claim 20, wherein the visual network operating system enables the user to load the device object, value control element object and visual reference object with the class-specific methods.

22. The graphical control system of claim 20, wherein the genetic methods provide for translation of the data contained by the window object, visual reference object and packet object into text that is stored in the computer storage medium.

23. The graphical control system of claim 20, wherein the genetic methods provide for communication between the five types of objects.

24. The graphical control system of claim 20, wherein the genetic methods provide for storage of the data contained by the window object, visual reference object and device object in the computer storage medium when the computer is disabled.

25. The graphical control system of claim 24, wherein the genetic methods provide for restoration of the data contained by the window object, visual reference object and device object from the computer storage medium when the computer is enabled.

26. The graphical control system of claim 20, wherein the class-specific methods of the window object provide for placement of the visual device control in the window displayed on the display of the computer.

27. The graphical control system of claim 20, wherein the class-specific methods of the visual reference object provide for unique graphical regeneration of the visual device control.

28. The graphical control system of claim 20, wherein the class-specific methods of the value control element object provide for further manipulation of the data representing the adjustment of the visual device control.

29. The graphical control system of claim 20, wherein the class-specific methods of the value control element object provide the logic for governing the visual device control using another visual device control.

30. The graphical control system of claim 20, wherein the class-specific methods of the device object provide for managing a graphical representation of the non-computer system device in the window.

31. The graphical control system of claim 20, wherein the class-specific methods of the packet object provide for communication of the data representing the adjustment of the visual device control between the computer and the interface of the non-computer system device via the communication medium.

32. The graphical control system of claim 1, further comprising a plurality of interfaces for coupling a plurality of non-computer system devices to the communication medium so that the graphical control system controls a plurality of non-computer system devices.

33. The graphical control system of claim 1, wherein the visual network operating system causes the computer to display a plurality of adjustable visual device controls, each visual device control graphically representing a feature control of a type normally associated with the non-computer system device, each visual device control having associated data stored in the computer storage medium that represents the adjustment of the visual device control.

34. The graphical control system of claim 1, wherein the communication medium is a network.

35. The graphical control system of claim 1, wherein the communication medium is a point-to point connection between a computer and a single non-computer system device.

36. The graphical control system of claim 1, wherein the visual network operating system employs an object-oriented programming paradigm in which a plurality of objects are used to control the interface.

37. The graphical control system of claim 36, wherein two types of objects are used for controlling the interface, said two types of objects comprising:

(a) a device control element object containing the data representing the adjustment of the feature control, and methods necessary for further interpreting and storing the data representing the adjustment of the feature control; and (b) an interface packet object containing data and methods necessary for communicating the change in data that represents the adjustment of the feature control to the computer.

38. The graphical control system of claim 37, wherein the methods of each of the two types of objects further comprise generic methods and class-specific methods.

39. The graphical control system of claim 38, wherein the visual network operating system enables the user to load the class-specific methods into the device control element object.

40. The graphical control system of claim 39, wherein the class-specific methods of the device control element object provide for further manipulation of the data representing the adjustment of the feature control.

41. The graphical control system of claim 39, wherein the class-specific methods of the interface packet object provide for communication of the data representing the adjustment of the feature control between the interface and the computer via the communication medium.

42. A method for controlling at least one non-computer system device including at least one device control, the device control governing an aspect of the non-computer system device, wherein the non-computer system device is coupled to a communication medium by an interface and connected via the communication medium to a computer system, wherein the computer system comprises a display, a processor, a storage medium and a user manipulation device, the method comprising:

(a) causing the computer to display a graphical control display representing the non-computer system device, the graphical control display having at least one adjustable graphical control, the graphical control representing a feature control of a type normally associated with the non-computer system device, the graphical control having associated data stored in the computer storage medium that represents the adjustment of the graphical control;

(b) enabling a user to adjust the graphical control by operating the user manipulation device upon the graphical control and effectuating a change in the data that represents the adjustment of the graphical control;

(c) communicating the change in the data that represents the adjustment of the graphical control to the interface;

(d) causing the interface to adjust the non-computer system device in accordance with the change in the data that represents the adjustment of the graphical control;

(e) detecting an adjustment to the feature control associated with the non-computer system device, the feature control having associated data stored in the interface storage, medium that represents an adjustment of the feature control;

(f) effectuating a change in the data that represents the adjustment of the feature control when the adjustment to the feature control is detected;

(g) communicating the change in the data representing the adjustment of the, feature control to the computer; and (h) causing the computer to regenerate any graphical controls representing the feature control in accordance with the change in the data that represents the adjustment of the feature control.

43. The method of claim 42, further comprising predefining a function for further manipulating the change in data that represents the adjustment of the graphical control before communicating the change in data to the interface.

44. The method of claim 43, wherein enabling the user to adjust the graphical control further comprises creating a clone of the graphical control so that the clone graphically represents the feature control, the clone having the same associated data as the graphical control.

45. The method of claim 44, wherein creating the clone further comprises enabling the user to effectuate a change in the data that represents the adjustment of the graphical control by operating the user manipulation device upon the clone.

46. The method of claim 45, wherein creating the clone further comprises enabling the user to graphically alter the clone in accordance with a predefined function, wherein the predefined function does not effectuate a change in the data that represents the adjustment of the graphical control, and wherein the predefined function does not graphically alter the graphical control.

47. The method of claim 44, wherein enabling the user to adjust the graphical control further comprises creating a plurality of clones of the graphical control so that each clone graphically represents the feature control, each clone having the same associated data as the graphical control.

48. The method of claim 42, further comprising causing the computer to display a template graphical control, said template graphical control graphically representing a hypothetical feature control of a type normally associated with a hypothetical non-computer system device.

49. The method of claim 48, further comprising enabling the user to create an adjustable master graphical control from the template graphical control by operating the user manipulation device, the master graphical control graphically representing the hypothetical feature control, the master graphical control having associated data stored in said computer storage medium that represents the adjustment of the master graphical control.

50. The method of claim 49, further comprising enabling the user to use the master graphical control to govern the graphical control, wherein enabling the user to use the master graphical control comprises:

(a) enabling the user to graphically create an interaction between the graphical control and the master graphical control by operating the user manipulation device;

(b) as a result of the interaction, establishing a relationship between the master graphical control and the graphical control;

(c) as a result of the relationship between the master graphical control and the graphical control, enabling the user to effectuate a change in the data representing the adjustment of the master graphical control by operating the user manipulation device, wherein the change in data representing the adjustment of the master graphical control also effectuates a similar change in the data representing the adjustment of the graphical control.

51. The method of claim 50, wherein enabling the user to effectuate a change in the data representing the adjustment of the master graphical control further comprises enabling the user to predefine a function for additionally manipulating the change in the data representing the adjustment of the master graphical control.

52. The method of claim 49, further comprising enabling the user to use the master graphical control to govern a plurality of graphical controls, wherein enabling the user to use the master graphical control comprises:

for each graphical control,
  (a) enabling the user to graphically create an interaction between the master graphical control and the graphical control by operating the user manipulation device;
  (b) as a result of the interaction, establishing a relationship between the master graphical control and the graphical control;
  (c) as a result of the relationship between the master graphical control and the graphical control, enabling the user to effectuate a change in the data representing the adjustment of the master graphical control by operating the user manipulation device, wherein the change in data representing the adjustment of the master graphical control also effectuates a similar change in the data representing the adjustment of the graphical control.

53. The method of claim 42, further comprising:
  (a) causing the computer to display the graphical control display representing the non-computer system device, the graphical control display having a plurality of adjustable graphical controls, each graphical control representing a feature control of a type normally associated with the non-computer system device, each graphical control having associated data stored in the computer storage medium that represents the adjustment of each graphical control; and
  (b) enabling a user to adjust each graphical control by operating the user manipulation device upon each graphical control and effectuating a change in the data that represents the adjustment of each graphical control.

54. The method of claim 42, further comprising predefining a function for further manipulating the change in data representing the adjustment of the feature control before communicating the change in data to the computer system.

55. The method of claim 42, further comprising causing the computer to display a plurality of graphical control display each graphical control displays representing at least one of a plurality of non-computer system devices, wherein each non-computer system device is coupled to the communication medium by an interface.

56. A graphical control system for controlling at least one non-computer system device, the graphical control system comprising:
  (a) a communication medium;
  (b) a computer coupled to the communication medium, the computer including a display, a processor, a storage medium and a user manipulation device;
  (c) an interface for coupling the non-computer system device to the communication medium, the interface including an interface processor mad an interface storage medium; and
  (d) a visual network operating system for controlling and monitoring operation of the computer and the interface by:
    (i) causing the computer to display an adjustable visual device control, the visual device control graphically representing a feature control of a type normally associated with the non-computer system device, the visual device control having associated data stored in the computer storage medium that represents the adjustment of the visual device control;
    (ii) enabling a user to adjust the visual device control by operating the user manipulation device upon the visual device control and effectuating a change in the data that represents the adjustment of the visual device control;
    (iii) communicating the change in the data that represents the adjustment of the visual device control to the interface;
    (iv) causing the interface to adjust the non-computer system device in accordance with the change in the data that represents the adjustment of the visual device control; and
    (v) causing the computer to display a template visual device control, the template visual device control graphically representing a hypothetical feature control of a non-computer system device that is not controlled and monitored by the visual network operating system.

57. The graphical control system of claim 56, wherein the visual network operating system enables the user to create an adjustable master visual device control from the template visual device control by operating the user manipulation device, the master visual device control graphically representing the hypothetical feature control, the master visual device control having associated data stored in said computer storage medium that represents the adjustment of the master visual device control.

58. The graphical control system of claim 57, wherein the visual network operating system enables the user to govern the visual device control using the master visual device control by:
  (a) enabling the user to graphically create an interaction between the visual device control and the master visual device control by operating the user manipulation device;
  (b) as a result of the interaction, establishing a relationship between the master visual device control and the visual device control so that:
    (i) operating the user manipulation device upon the master visual device control effectuates a change in the data representing the adjustment of the master visual device control; and
    (ii) the change in the data representing the adjustment of the master visual device control effectuates a similar change in the data representing the adjustment of the visual device control.

59. The graphical control system of claim 58, wherein the visual network operating system enables the user to govern a plurality of visual device controls using the master visual device control.

60. The graphical control system of claim 57, wherein the visual network operating system enables the user to predefine a function for further manipulating the change in data representing the adjustment of the master visual device control so that the manipulated change in the data representing the adjustment of the master visual device control effectuates a similar manipulated change in the data representing the adjustment of the visual device control.

61. A graphical control system for controlling at least one non-computer system device, the graphical control system comprising:
  (a) a communication medium;
  (b) a computer coupled to the communication medium, the computer including a display, a processor, a storage medium and a user manipulation device;
  (c) an interface for coupling the non-computer system device to the communication medium, the interface including an interface processor and an interface storage medium; and (d) a visual network operating system for controlling and monitoring operation of the computer and the interface by:

(i) causing the computer to display an adjustable visual device control, the visual device control graphically representing a feature control of a type normally associated with the non-computer system device, the visual device control having associated data stored in the computer storage medium that represents the adjustment of the visual device control;

(ii) enabling a user to adjust the visual device control by operating the user manipulation device upon the visual device control and effectuating a change in the data that represents the adjustment of the visual device control;

(iii) communicating the change in the data that represents the adjustment of the visual device control to the interface;

(iv) causing the interface to adjust the non-computer system device in accordance with the change in the data that represents the adjustment of the visual device control; and (v) enabling the user to create a clone of the visual device control which also graphically represents and controls the feature control, wherein the clone has the same associated data stored in the computer storage medium as the visual device control.

62. The graphical control system of claim 61, wherein the visual network operating system enables the user to effectuate a change in the data that represents the adjustment of the visual device control by operating the user manipulation device upon the clone.

63. The graphical control system of claim 61, wherein the visual network operating system enables the user to graphically alter the clone without effectuating a change in the data that represents the adjustment of the visual device control and without graphically altering the visual device control.

64. The graphical control system of claim 61, wherein the visual network operating system enables the user to create a plurality of clones of the visual device control so that each clone graphically represents the feature control, each clone having the same associated data as the visual device control.

65. The graphical control system of claim 61, wherein the visual network operating system enables the user to predefine a function for further manipulating the change in data that represents the adjustment of the visual device control.

66. A method for controlling at least one non-computer system device including at least one device control, the device control governing an aspect of the non-computer system device, wherein the non-computer system device is coupled to a communication medium by an interface and connected via the communication medium to a computer system, wherein the computer system comprises a display, a processor, a storage medium and a user manipulation device, the method comprising:

(a) causing the computer to display a graphical control display representing the non-computer system device, the graphical control display having at least one adjustable graphical control, the graphical control representing a feature control of a type normally associated with the non-computer system device, the graphical control having associated data stored in the computer storage medium that represents the adjustment of the graphical control;

(b) enabling a user to adjust the graphical control by operating the user manipulation device upon the graphical control and effectuating a change in the data that represents the adjustment of the graphical control;

(c) communicating the change in the data that represents the adjustment of the graphical control to the interface;

(d) causing the interface to adjust the non-computer system device in accordance with the change in the data that represents the adjustment of the graphical control; and (e) causing the computer to display a template graphical control, said template graphical control graphically representing a hypothetical feature control of a non-computer system device that is not connected to the communication medium.

67. The method of claim 66, further comprising enabling the user to create an adjustable master graphical control from the template graphical control by operating the user manipulation device, the master graphical control graphically representing the hypothetical feature control, the master graphical control having associated data stored in said computer storage medium that represents the adjustment of the master graphical control.

68. The method of claim 67, further comprising enabling the user to use the master graphical control to govern the graphical control, wherein enabling the user to use the master graphical control comprises:

(a) enabling the user to graphically create an interaction between the graphical control and the master graphical control by operating the user manipulation device;

(b) as a result of the interaction, establishing a relationship between the master graphical control and the graphical control;

(c) as a result of the relationship between the master graphical control and the graphical control, enabling the user to effectuate a change in the data representing the adjustment of the master graphical control by operating the user manipulation device, wherein the change in data representing the adjustment of the master graphical control also effectuates a similar change in the data representing the adjustment of the graphical control.

69. The method of claim 68, wherein enabling the user to effectuate a change in the data representing the adjustment of the master graphical control further comprises enabling the user to predefine a function for additionally manipulating the change in the data representing the adjustment of the master graphical control.

70. The method of claim 68, further comprising enabling the user to use the master graphical control to govern a plurality of graphical controls, wherein enabling the user to use the master graphical control comprises:

for each graphical control, (a) enabling the user to graphically create an interaction between the master graphical control and the graphical control by operating the user manipulation device;

(b) as a result of the interaction, establishing a relationship between the master graphical control and the graphical control;

(c) as a result of the relationship between the master graphical control and the graphical control, enabling the user to effectuate a change in the data representing the adjustment of the master graphical control by operating the user manipulation device, wherein the change in data representing the adjustment of the master graphical control also effectuates a similar change in the data representing the adjustment of the graphical control.

71. A method for controlling at least one non-computer system device including at least one device control, the device control governing an aspect of the non-computer system device, wherein the non-computer system device is coupled to a communication medium by an interface and connected via the communication medium to a computer system, wherein the computer system comprises a display, a processor, a storage medium and a user manipulation device, the method comprising:

(a) causing the computer to display a graphical control display representing the non-computer system device, the graphical control display having at least one adjustable graphical control, the graphical control representing a feature control of a type normally associated with the, non-computer system device, the graphical control having associated data stored in the computer storage medium that represents the adjustment of the graphical control;

(b) enabling a user to adjust the graphical control by operating the user manipulation device upon the graphical control and effectuating a change in the data that represents the adjustment of the graphical control;

(c) communicating the change in the data that represents the adjustment of the graphical control to the interface;

(d) causing the interface to adjust the non-computer system device in accordance with the change in the data that represents the adjustment of the graphical control; and (e) creating a clone of the graphical control which along with the graphical control, graphically represents and controls the feature control, the clone having the same associated data as the graphical control.

72. The method of claim 71, wherein creating the clone further comprising enabling the user to effectuate a change in the data that represents the adjustment of the graphical control by operating the user manipulation device upon the clone.

73. The method of claim 72, wherein creating the clone further comprising enabling the user to graphically alter the clone in accordance with a predefined function, wherein the predefined function does not effectuate a change in the data that represents the adjustment of the graphical control, and wherein the predefined function does not graphically alter the graphical control.

74. The method of claim 71, wherein enabling the user to adjust the graphical control further comprises creating a plurality of clones of the graphical control so that each clone graphically represents the feature control, each clone having the same associated data as the graphical control.

* * * * *

UNITED STATES PATENT AND TRADEMARK OFFICE
CERTIFICATE OF CORRECTION

PATENT NO. : 5,657,221   Page 1 of 2
DATED : August 12, 1997
INVENTOR(S) : D.J. Warman et al.

It is certified that error appears in the above-indentified patent and that said Letters Patent is hereby corrected as shown below:

| COLUMN | LINE | ERROR |
|---|---|---|
| | | |
| 31 (Claim 22, | 67 line 2) | "genetic" should read --generic-- |
| 32 (Claim 23, | 5 line 2) | "genetic" should read --generic-- |
| 32 (Claim 24, | 8 line 2) | "genetic" should read --generic-- |
| 32 (Claim 25, | 13 line 2) | "genetic" should read --generic-- |
| 33 (Claim 42, | 57 line 31) | After "storage" please delete the "," |
| 33 (Claim 42, | 63 line 37) | After "adjustment of the" please delete the "," |

UNITED STATES PATENT AND TRADEMARK OFFICE
CERTIFICATE OF CORRECTION

PATENT NO. : 5,657,221

DATED : August 12, 1997

INVENTOR(S) : D.J. Warman et al.

It is certified that error appears in the above-indentified patent and that said Letters Patent is hereby corrected as shown below:

| COLUMN | LINE | ERROR |
|---|---|---|
| 35 (Claim 56, | 53 line 10) | "processor mad" should read --processor and-- |
| 39 (Claim 71, | 12-13 line 15) | After "associated with the" please delete the "," |

Signed and Sealed this

Twentieth Day of January, 1998

Attest:

Attesting Officer

BRUCE LEHMAN

Commissioner of Patents and Trademarks